US012187338B2

(12) United States Patent
Popovits, II et al.

(10) Patent No.: US 12,187,338 B2
(45) Date of Patent: Jan. 7, 2025

(54) PALLET SLED

(71) Applicant: Rehrig Pacific Company, Los Angeles, CA (US)

(72) Inventors: Joseph E. Popovits, II, Costa Mesa, CA (US); Sydney Marie Ogawa-Garcia, Huntington Beach, CA (US); Dane Gin Mun Kalinowski, Foothill Ranch, CA (US); Travis James Englert, Brea, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 616 days.

(21) Appl. No.: 17/403,374

(22) Filed: Aug. 16, 2021

(65) Prior Publication Data

US 2022/0048550 A1      Feb. 17, 2022

Related U.S. Application Data

(60) Provisional application No. 63/146,364, filed on Feb. 5, 2021, provisional application No. 63/066,115, filed on Aug. 14, 2020.

(51) Int. Cl.
*B62B 3/06*        (2006.01)
*B62B 3/02*        (2006.01)
(Continued)

(52) U.S. Cl.
CPC .............. *B62B 3/0625* (2013.01); *B62B 3/02* (2013.01); *B62B 3/0606* (2013.01); *B62B 3/10* (2013.01);
(Continued)

(58) Field of Classification Search
CPC .... B62B 3/06–0631; B66F 17/00; B66F 5/00; B66F 5/02; B66F 7/06; B66F 7/0625; B66F 7/0633–0641
See application file for complete search history.

(56) References Cited

U.S. PATENT DOCUMENTS

| 1,942,360 A | 8/1877 | Grable et al. |
| 2,067,460 A | 8/1878 | Newland |

(Continued)

FOREIGN PATENT DOCUMENTS

| DE | 29619299 U1 | 1/1997 |
| GB | 419264 A | 11/1934 |

(Continued)

OTHER PUBLICATIONS

U.S. Appl. No. 15/639,266, filed Jun. 30, 2017.
U.S. Appl. No. 15/788,967, filed Oct. 20, 2017.
U.S. Appl. No. 15/606,598, filed May 26, 2017.

*Primary Examiner* — Tyrone V Hall, Jr.
(74) *Attorney, Agent, or Firm* — Carlson, Gaskey & Olds, P.C.

(57) ABSTRACT

A pallet sled includes a lower frame and a plurality of wheels supporting the lower frame. An upper frame is configured to support a pallet thereon. A ratchet is configured to lift the upper frame relative to the lower frame. A handle is configured to operate the ratchet to lift the upper frame relative to the lower frame. The handle may be pivotable relative to the lower frame. The ratchet may include a gear and a pawl. The ratchet may also be configured to selectively lower the upper frame. As another option, one or more of the handle, the upper frame or the plurality of wheels are reconfigurable between an extended position and a retracted position.

24 Claims, 42 Drawing Sheets

(51) Int. Cl.
  *B62B 3/10* (2006.01)
  *B62B 5/06* (2006.01)
  *B66F 5/02* (2006.01)
  *B66F 7/06* (2006.01)
  *B66F 9/065* (2006.01)
  *B66F 9/20* (2006.01)

(52) U.S. Cl.
  CPC .............. *B62B 5/064* (2013.01); *B62B 5/067* (2013.01); *B66F 5/02* (2013.01); *B66F 7/0625* (2013.01); *B66F 9/065* (2013.01); *B66F 9/20* (2013.01); *B62B 2203/24* (2013.01); *B62B 2205/14* (2013.01); *B62B 2206/06* (2013.01)

(56) References Cited

U.S. PATENT DOCUMENTS

| | | |
|---|---|---|
| 1,129,775 A | 2/1915 | Anthony |
| 1,133,411 A | 3/1915 | Steele |
| 1,196,995 A | 9/1916 | Tuttle |
| 1,329,995 A | 2/1920 | Oubridge |
| 1,497,085 A | 2/1921 | Brandt |
| 1,394,375 A * | 10/1921 | Torkildson ............... B66F 5/02 254/8 B |
| 1,436,665 A | 11/1922 | Monro |
| 1,609,017 A | 12/1925 | Firestone |
| 1,818,060 A | 9/1928 | Holman |
| 2,028,133 A | 9/1934 | Bowers |
| 2,121,764 A | 6/1938 | Quayle |
| 2,251,606 A | 2/1939 | Wobbe |
| 2,319,581 A | 3/1941 | Brownlee et al. |
| 2,414,277 A | 1/1947 | Shepard, Jr. et al. |
| 2,506,381 A | 5/1950 | Nilsson |
| 2,546,539 A | 3/1951 | Fehn |
| 2,822,944 A | 2/1958 | Blomgren |
| 2,840,346 A | 6/1958 | Du Moulin |
| 2,860,852 A | 11/1958 | Lewis, Jr. |
| 3,059,904 A | 10/1962 | Kimball |
| 3,074,691 A | 1/1963 | Knapp et al. |
| 3,129,923 A | 4/1964 | Kikuchi |
| 3,290,051 A | 12/1966 | O'Brien et al. |
| 3,306,579 A | 2/1967 | Campbell |
| 3,547,288 A | 12/1970 | Butler et al. |
| 4,102,464 A | 6/1978 | Schuster |
| 4,714,026 A | 12/1987 | Yamaguchi et al. |
| 4,854,422 A | 8/1989 | Kawada et al. |
| 5,378,004 A | 1/1995 | Gunlock et al. |
| 5,405,236 A | 4/1995 | Sundstrom et al. |
| 5,449,266 A | 9/1995 | Evans |
| 5,752,584 A * | 5/1998 | Magoto ..................... B62B 3/06 187/233 |
| 5,951,234 A | 9/1999 | Johansson |
| 6,024,376 A | 2/2000 | Golichowski et al. |
| 6,186,728 B1 | 2/2001 | Michaud |
| 6,425,724 B1 | 7/2002 | Williamson |
| 6,729,632 B2 | 5/2004 | Ferrigan |
| 7,114,906 B1 | 10/2006 | Baumgarner et al. |
| 7,856,932 B1 | 12/2010 | Stahl et al. |
| 7,987,797 B2 | 8/2011 | Stahl et al. |
| 7,988,405 B2 | 8/2011 | Ellington |
| 8,011,677 B1 | 9/2011 | Ellington et al. |
| 8,075,244 B2 | 12/2011 | Ellington |
| 8,282,111 B2 | 10/2012 | Hailston et al. |
| 8,360,443 B2 | 1/2013 | Ellington |
| 8,376,089 B2 | 2/2013 | Stone |
| 8,776,697 B1 | 7/2014 | O'Connell |
| 8,894,076 B2 | 11/2014 | Hailston et al. |
| 8,950,759 B2 | 2/2015 | Thorsen et al. |
| 9,260,125 B2 | 2/2016 | Ellington et al. |
| 9,309,096 B2 | 4/2016 | Mariotti |
| 9,403,547 B2 | 8/2016 | Ellington |
| 9,611,071 B2 | 4/2017 | Baltz et al. |
| 10,464,586 B2 | 11/2019 | Kalinowski et al. |
| 10,589,769 B2 | 3/2020 | Kalinowski et al. |
| 10,793,176 B2 | 10/2020 | King et al. |
| 2002/0109345 A1 | 8/2002 | Dufty |
| 2003/0234517 A1 | 12/2003 | Sagol |
| 2005/0023781 A1 * | 2/2005 | Ortega ..................... B62B 1/14 280/47.24 |
| 2007/0116548 A1 | 5/2007 | Cooper |
| 2009/0183953 A1 | 7/2009 | Ellington |
| 2009/0185890 A1 * | 7/2009 | Ellington .............. B62B 3/0606 414/800 |
| 2010/0295261 A1 | 11/2010 | Ellington |
| 2011/0171000 A1 | 7/2011 | Hailston |
| 2012/0153585 A1 * | 6/2012 | Ryan ..................... B62B 5/067 280/47.18 |
| 2013/0202400 A1 | 8/2013 | Richard et al. |
| 2013/0223962 A1 | 8/2013 | Ellington et al. |
| 2015/0203138 A1 | 7/2015 | Hassell et al. |
| 2015/0225215 A1 | 8/2015 | King et al. |
| 2017/0240194 A1 | 8/2017 | Kalinowski et al. |
| 2017/0297881 A1 | 10/2017 | King et al. |
| 2017/0341667 A1 * | 11/2017 | Kalinowski .............. B62B 3/001 |
| 2018/0057032 A1 | 3/2018 | Brewer et al. |
| 2018/0319212 A1 | 11/2018 | Lindgren |
| 2019/0367065 A1 | 12/2019 | Kalinowski et al. |
| 2020/0283045 A1 | 9/2020 | Kalinowski et al. |
| 2021/0070340 A1 | 3/2021 | King et al. |

FOREIGN PATENT DOCUMENTS

| | | |
|---|---|---|
| JP | 2006298230 A | 11/2006 |
| WO | 2014067077 A1 | 5/2014 |

* cited by examiner

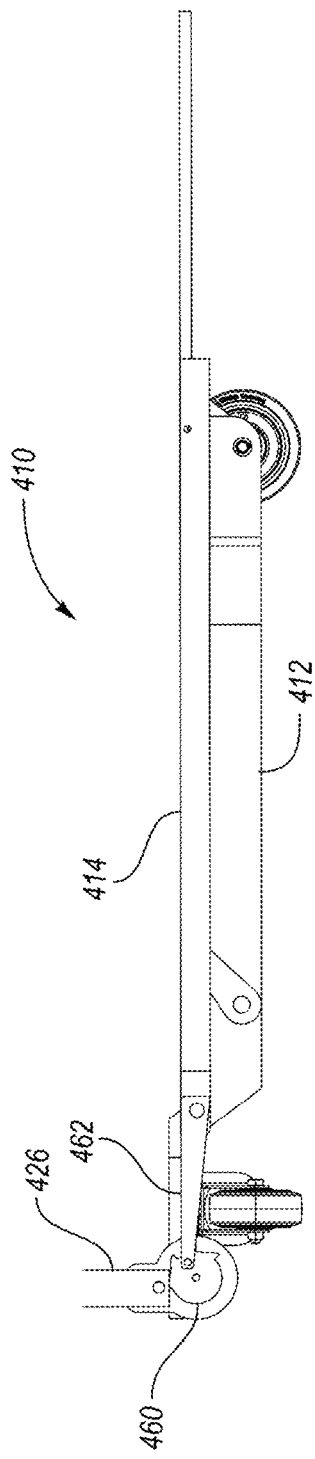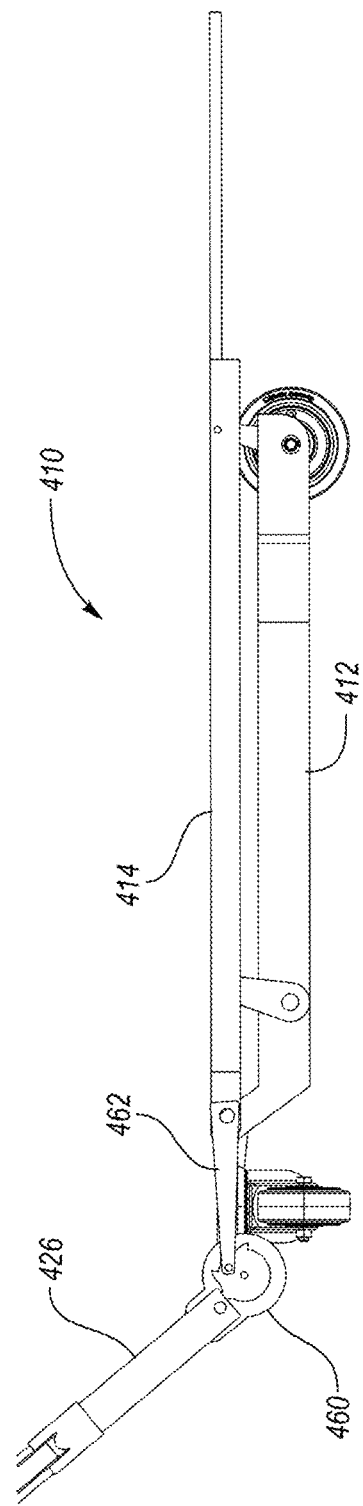

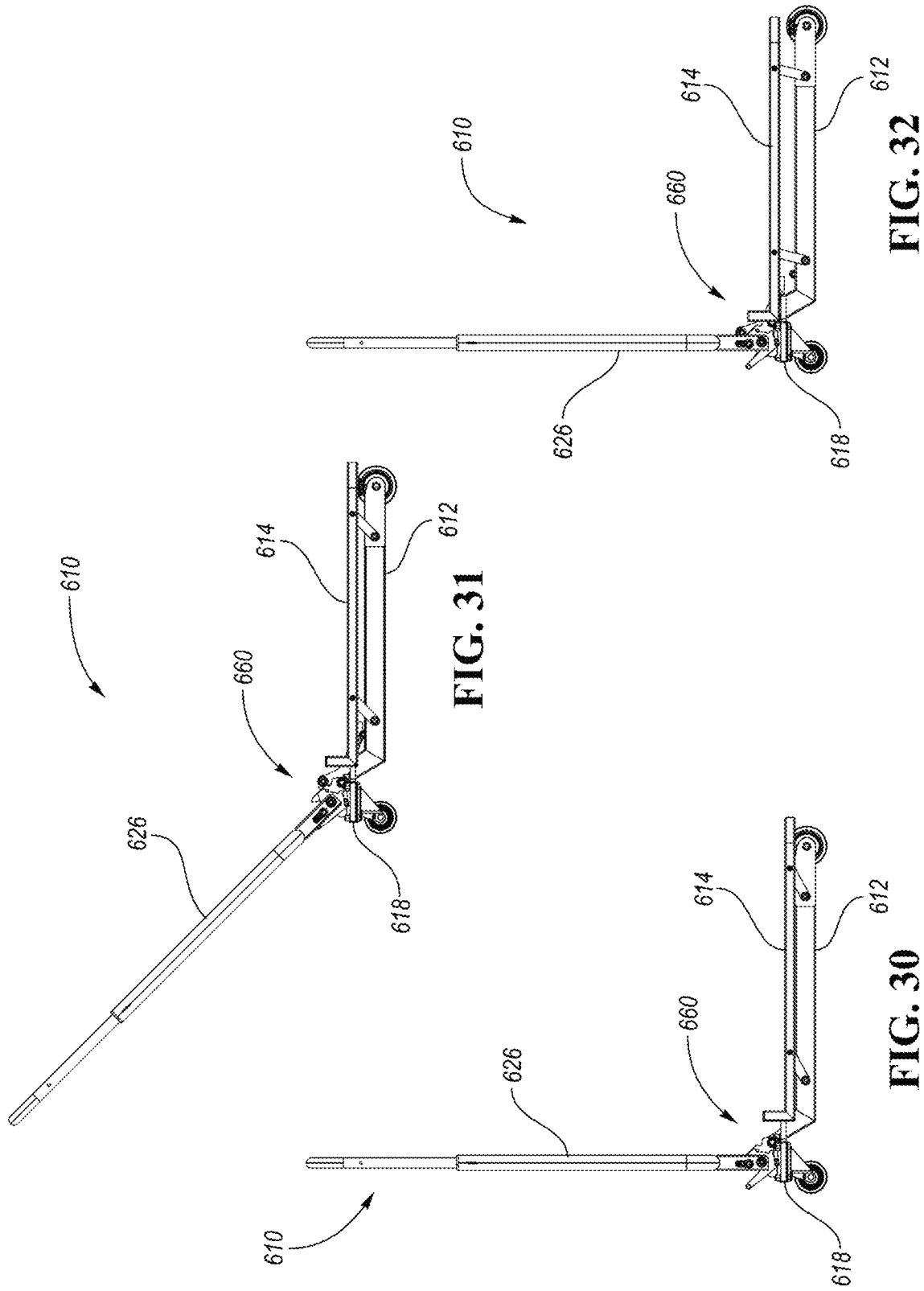

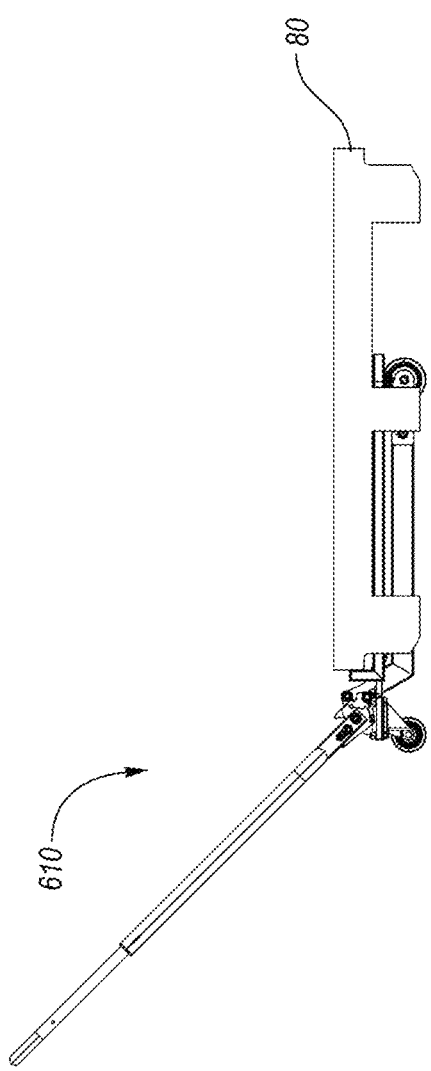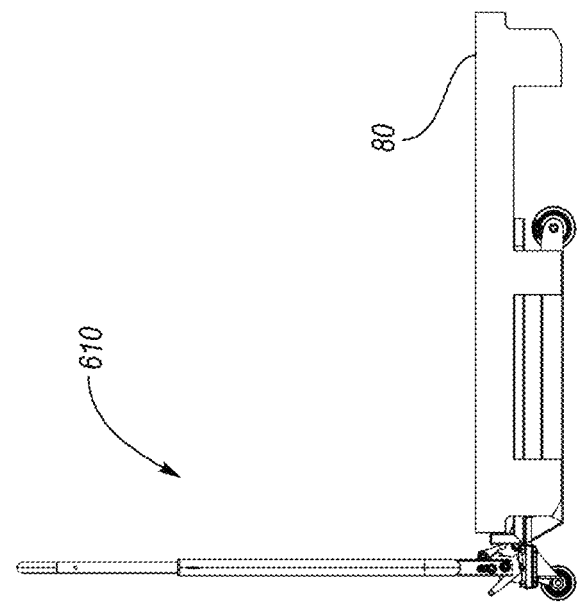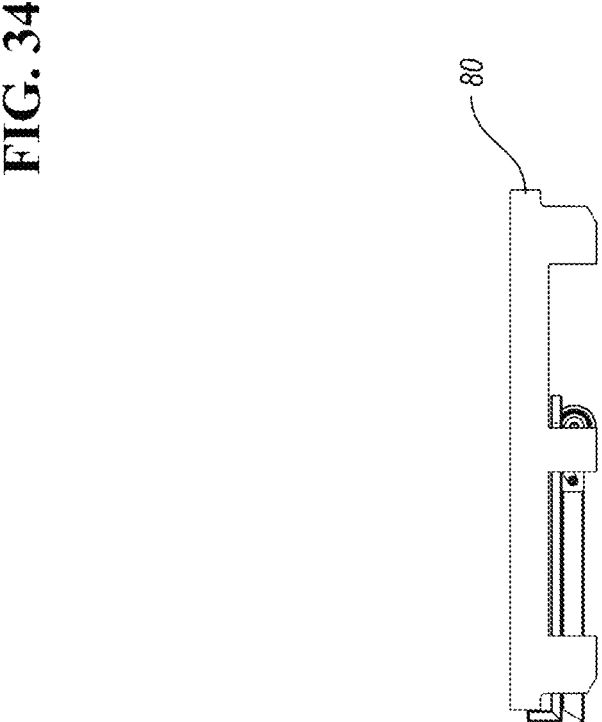

PALLET SLED

BACKGROUND

Pallets, such as half-pallets, may be loaded with goods for delivery to a store. The loaded pallets are carried in a truck to the store. The loaded pallets are then brought into a back room of a store. Later, a merchandiser may downstack the goods from each pallet onto a hand truck or dolly to move the goods onto the store floor. The merchandiser may move the goods onto the shelves in the store.

SUMMARY

A pallet sled includes a lower frame and a plurality of wheels supporting the lower frame. An upper frame is configured to support a pallet thereon. A ratchet is configured to lift the upper frame relative to the lower frame. A handle is configured to operate the ratchet to lift the upper frame relative to the lower frame. The handle may be pivotable relative to the lower frame.

The ratchet may include a gear and a pawl. The ratchet may also be configured to selectively lower the upper frame. A catch bar coupled to the handle may selectively engage the gear to lift and lower the upper frame. An outer plate is pivotably mounted relative to the lower frame and configured to selectively disengage the catch bar from the gear. The catch bar may be biased toward the gear by a spring.

The pawl may be biased toward the gear when the ratchet is in a lifting mode. The pawl may be biased away from the gear when the ratchet is in a lowering mode.

The catch bar is configured to engage the outer plate which is configured to switch the pawl from being biased away from the gear to being biased toward the gear. The outer plate may be coupled to a spring configured to bias the pawl toward and away from the gear. The outer plate may be coupled to a pedal configured to be activated by a foot of a user. The spring may have a first end slidably mounted relative to the lower frame and a second end secured to an arm coupled to the pawl. The spring may be configured such that it biases the pawl toward the gear when the first end of the spring is in a first position and such that it biases the pawl away from the gear when the first end of the spring is in a second position, spaced away from the first position.

As another option, one or more of the handle, the upper frame or the plurality of wheels are reconfigurable between an extended position and a retracted position. In the retracted position, the pallet sled can easily fit into a car trunk or back seat.

The handle, the upper frame or the plurality of wheels may include an extension that is reconfigurable between the extended position and the retracted position.

The upper frame may include a frame extension movable between the extended position and a retracted position. The extension may be a handle extension. The extension may be a wheel extension.

The pallet sled may be small enough and light enough to carry in a vehicle trunk or backseat. The pallet sled may also have some retractable or collapsible components to further reduce the overall size for storage and portability.

BRIEF DESCRIPTION OF THE DRAWINGS

FIG. 18 shows one lift mechanism that could be used with any of the sleds disclosed herein, with the upper frame in a lower position.

FIG. 19 shows the lift mechanism of FIG. 18 with the upper frame in a raised position.

FIG. 30 shows the pallet sled of FIG. 20 in a low position.

FIG. 31 shows the pallet sled of FIG. 20 in a mid lift position.

FIG. 32 shows the pallet sled of FIG. 20 in a max lift position.

FIG. 33 shows the pallet sled of FIG. 20 in a low position under a pallet.

FIG. 34 shows the pallet sled of FIG. 20 in a mid lift position lifting a pallet.

FIG. 35 shows the pallet sled of FIG. 20 in a max lift position lifting a pallet.

DETAILED DESCRIPTION OF PREFERRED EMBODIMENTS

Figure 1:
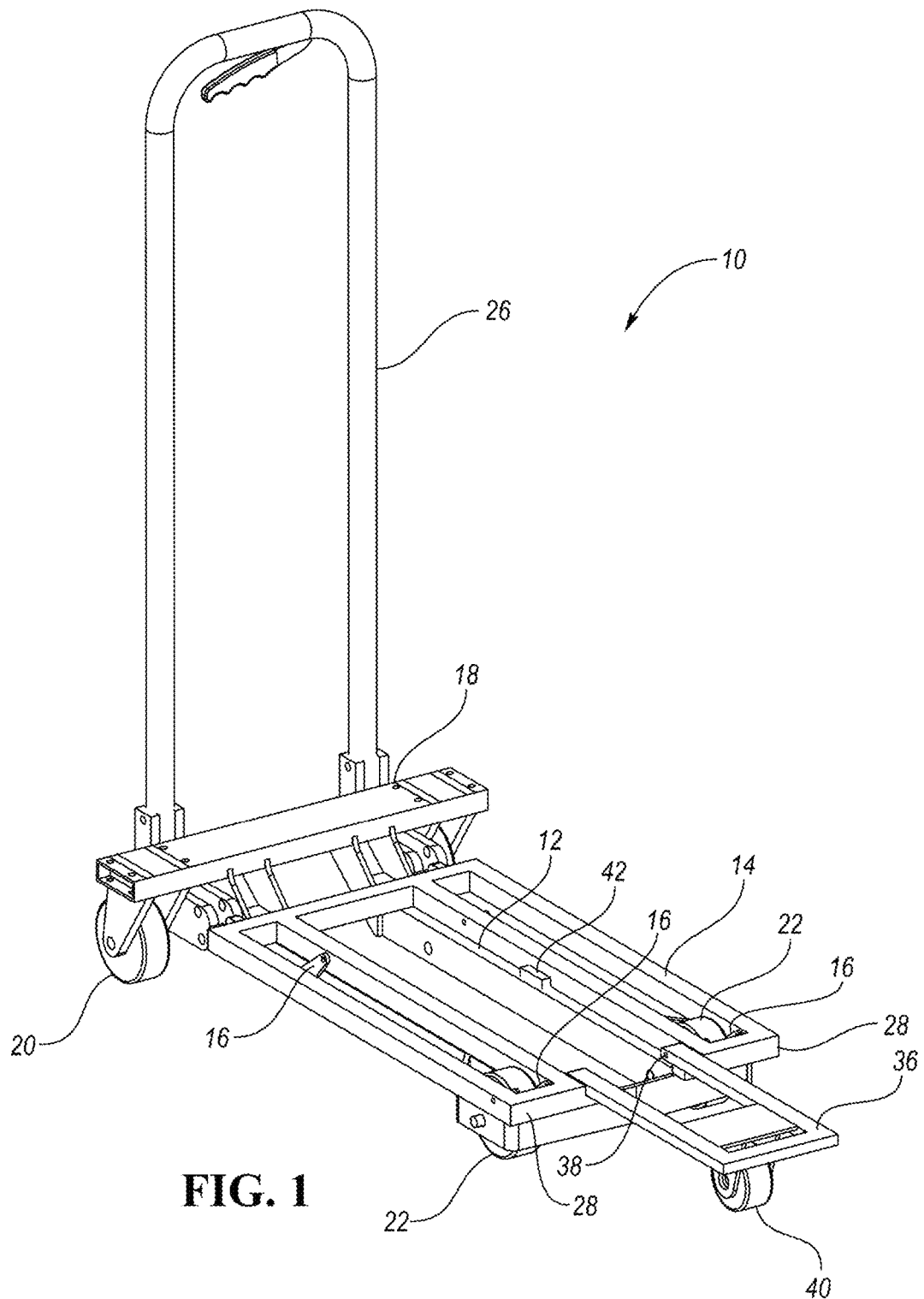
FIG. 1 is a perspective view of a pallet sled according to a first embodiment.

A pallet sled 10 is shown in FIG. 1. The sled 10 is used for lifting and moving pallets, particularly half-pallets. The pallet sled 10 includes a lower frame 12 and upper frame 14 connected by pivot arms 16. The upper frame 14 can be raised and lowered relative to the lower frame 12 by the user to lift a pallet. The lower frame 12 includes a base 18 at a forward end of the sled 10. Wheels 20 support the base 18. Wheels 22 support the rearward end of the lower frame 12.

A handle 26 extends upward from the base 18. The handle 26 is used to raise and lower the upper frame 14 relative to the lower frame 12. The handle 26 is also used to move the sled 10.

The upper frame 14 includes a pair of spaced-apart arms 28. The upper frame 14 is open rearwardly of the sled 10. In this example, each arm includes a pair of spaced-apart rails. In the lowered position shown in FIG. 1, the wheels 22 are partially received between the rails of each arm 28.

The upper frame 14 includes a frame extension 36, shown in FIG. 1 in the extended position, mostly rearward of and partially between the arms 28 of the upper frame 14. The frame extension 36 is pivotably secured to opposing faces of the arms 28 at pivot axes 38 at rearward ends of arms 28 of the upper frame 14. Support ledges 42 are formed on opposing faces of the arms 28 at approximate mid-points of the upper frame 14 and recessed downward from the upper support surface of the upper frame 14.

Figure 2:
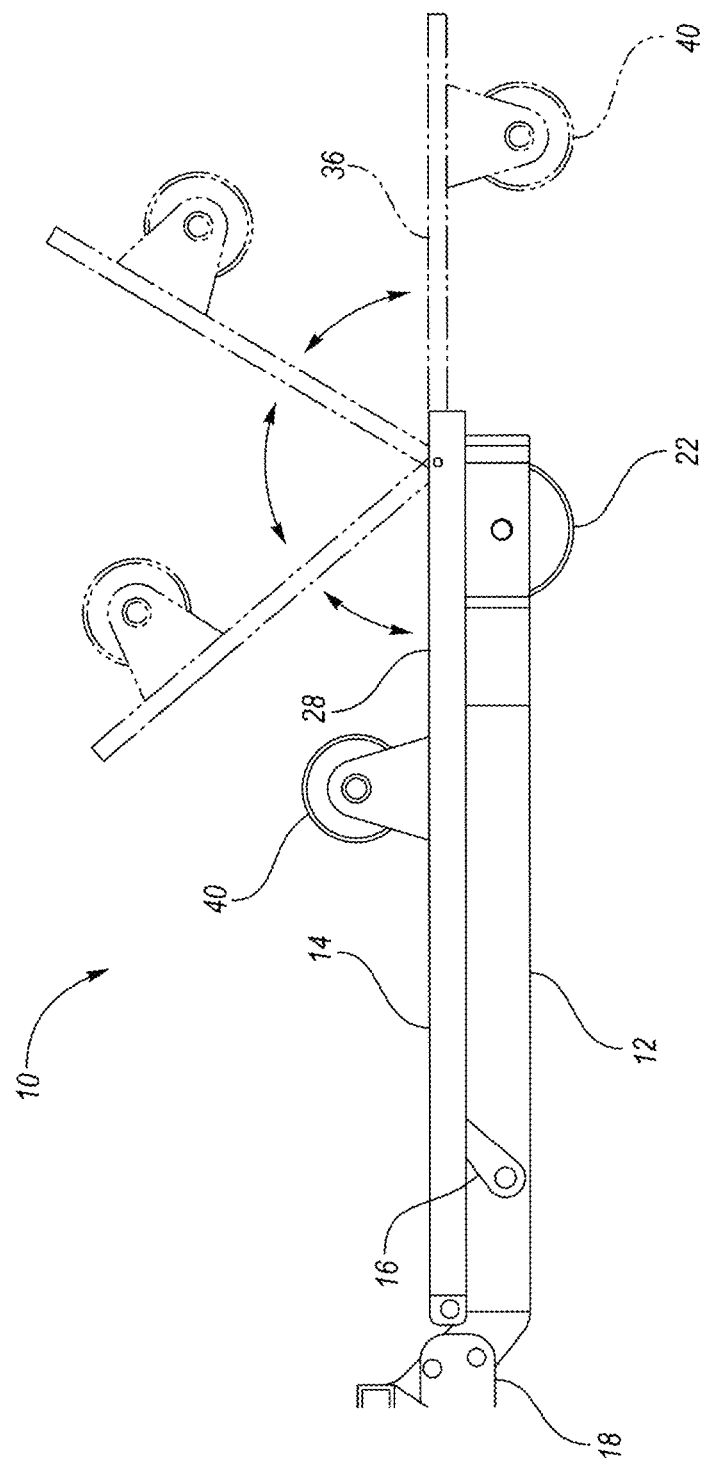
FIG. 2 is a side view of the frame of the pallet sled, showing different positions of the frame extension.

As shown in FIG. 2, the frame extension 36 can be pivoted to a retracted position largely or completely between the arms 28 of the upper frame 14. The frame extension 36 can be pivoted outward (rearward) to the extended position, shown in broken lines in FIG. 2. In the extended position, the frame extension 36 further supports a pallet thereon or goods thereon. Note that the frame extension 36 is an extension of the upper frame 14 and would rise and lower with the upper frame 14 while ensuring that the pallet is supported sufficiently. The rest of the upper frame 14 (and the lower frame 12) can be made shorter than it would without the frame extension 36, so that the overall size of the pallet sled 10 can be reduced when not in use. In this manner, the pallet sled 10 can be placed in a vehicle trunk or backseat (for example).

Figure 3:
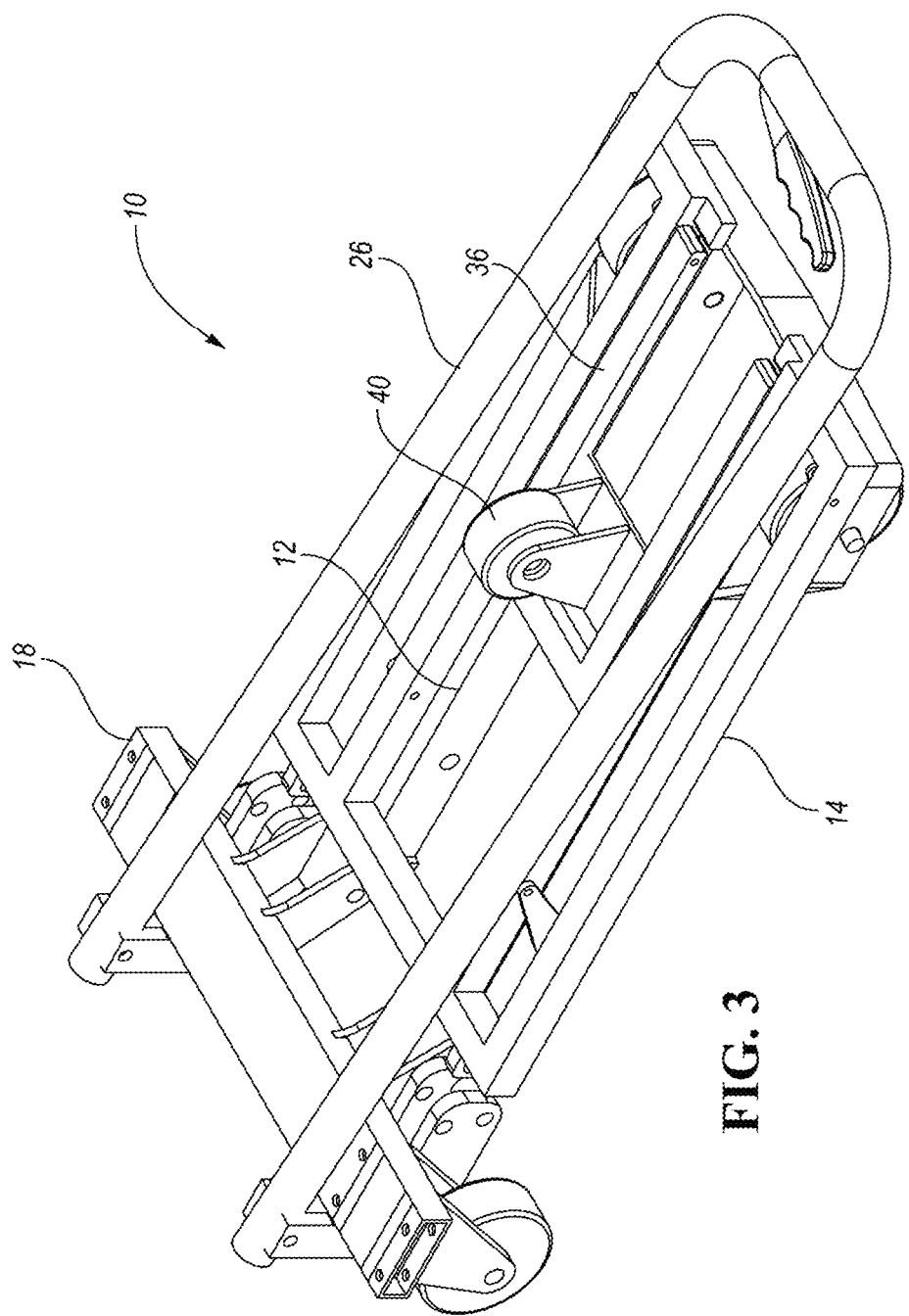
FIG. 3 shows the pallet sled of FIG. 1 in a folded position.

As shown in FIG. 3, the pallet sled 10 can further be folded into a compact package by folding the handle 26 down onto the upper frame 14. Pins or other locks connecting the handle 26 to the base 18 can be released to permit the handle 26 to be folded as shown. Again, this makes the sled 10 more portable when being transported or stored.

Figure 4:
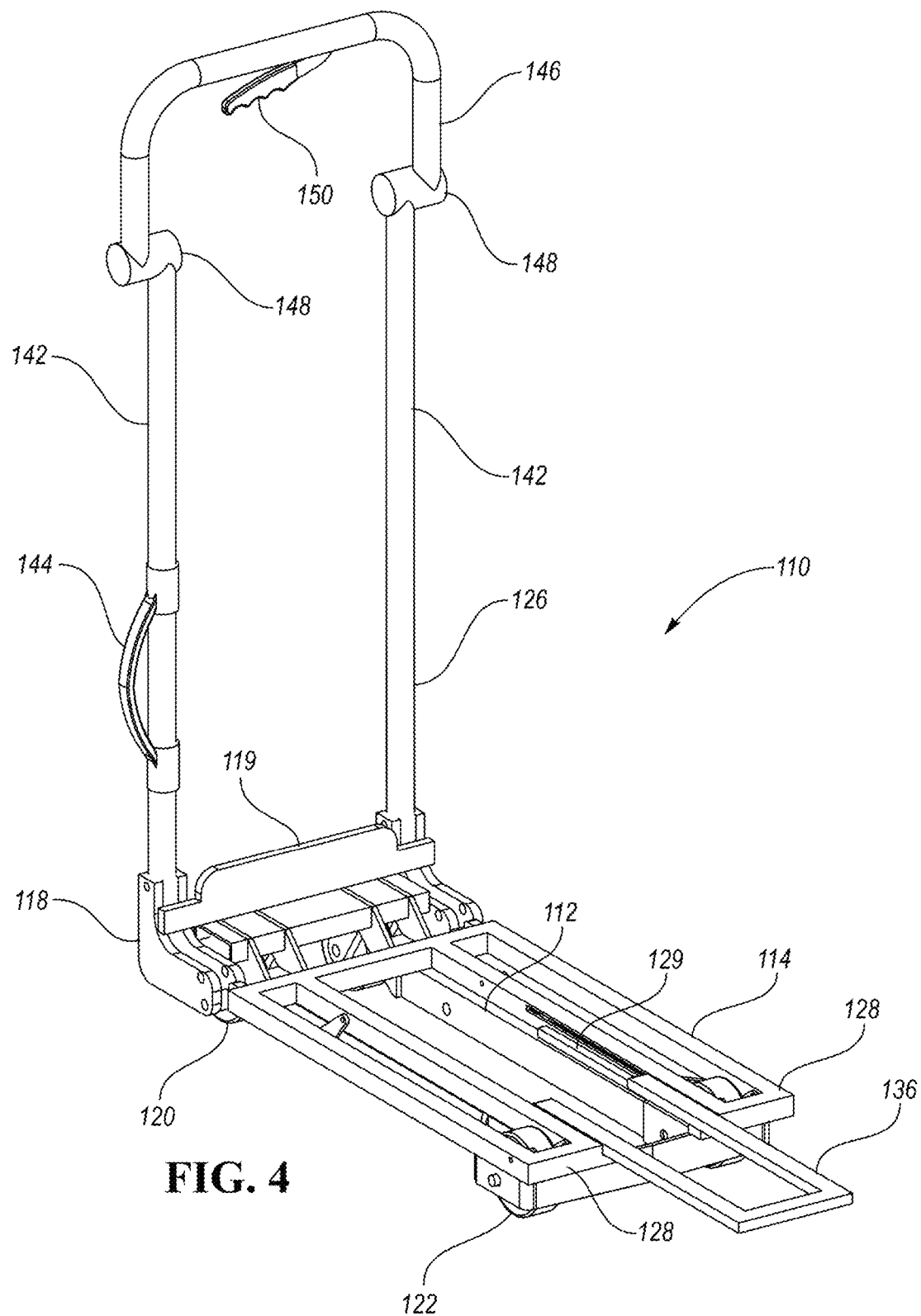
FIG. 4 is a perspective view of a pallet sled according to a second embodiment.

A pallet sled 110 according to a second embodiment is shown in FIG. 4. The pallet sled 110 includes a lower frame 112 and upper frame 114 connected by pivot arms 116. The upper frame 114 can be raised and lowered relative to the lower frame 112 by the user to lift a pallet. The lower frame 112 includes a base 118 at a forward end of the sled 110. Wheels 120 support the base 118. Wheels 122 support the rearward end of the lower frame 112.

A handle 126 extends upward from the base 118. The handle 126 is used to raise and lower the upper frame 114 relative to the lower frame 112, and to move the sled 110. The base 118 may include a vertical forward plate 119.

The upper frame 114 includes a pair of spaced-apart arms 128. The upper frame 114 is open rearwardly of the sled 110. The upper frame 114 includes a frame extension 136, shown in FIG. 1 in the extended position, mostly rearward of and partially between the arms 128 of the upper frame 114. In this embodiment, the frame extension 136 is slidably or telescopically connected to arms 128 of the upper frame 114. The frame extension 136 may be slidably supported on ledges 129 on opposing faces of the arms 128 of the upper frame 114.

The handle 126 includes vertical portions 142 extending upward from the base 118. In this embodiment, the handle 126 includes a handle extension 146 forming an upper end thereof. The handle extension 146 is shown in FIG. 4 in an extended position but is pivotable about hinges 148 connected to upper ends of the vertical portions 142. A lever 150 is mounted to a cross portion of the handle extension 146.

Figure 5:
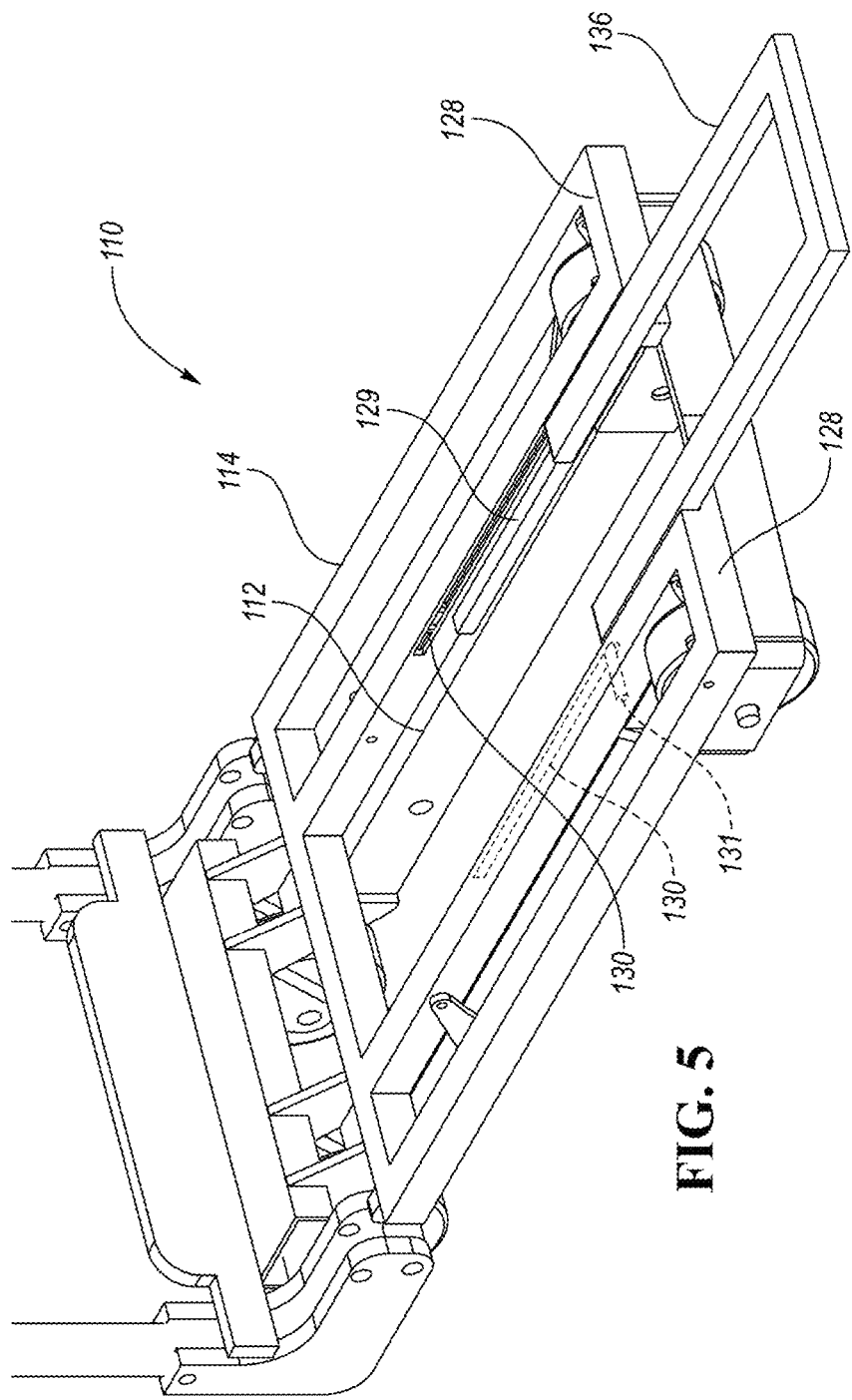
FIG. 5 is an enlarged view of the upper frame and lower frame of the pallet sled of FIG. 4.

FIG. 5 is an enlarged view of the upper frame 114 and lower frame 112 of the sled 110 of FIG. 4. The frame extension 136 is slidably secured to channels 130 on opposing faces of the arms 128 of the upper frame 114. As shown, the forward ends of the frame extension 136 may include pins 131 (one shown) slidably received in the channels 130. The upper surface of the frame extension 136 is substantially flush with the upper surface of the upper frame 114. The frame extension 136 increases the support for a pallet or goods stacked on the sled 10.

Figure 6:
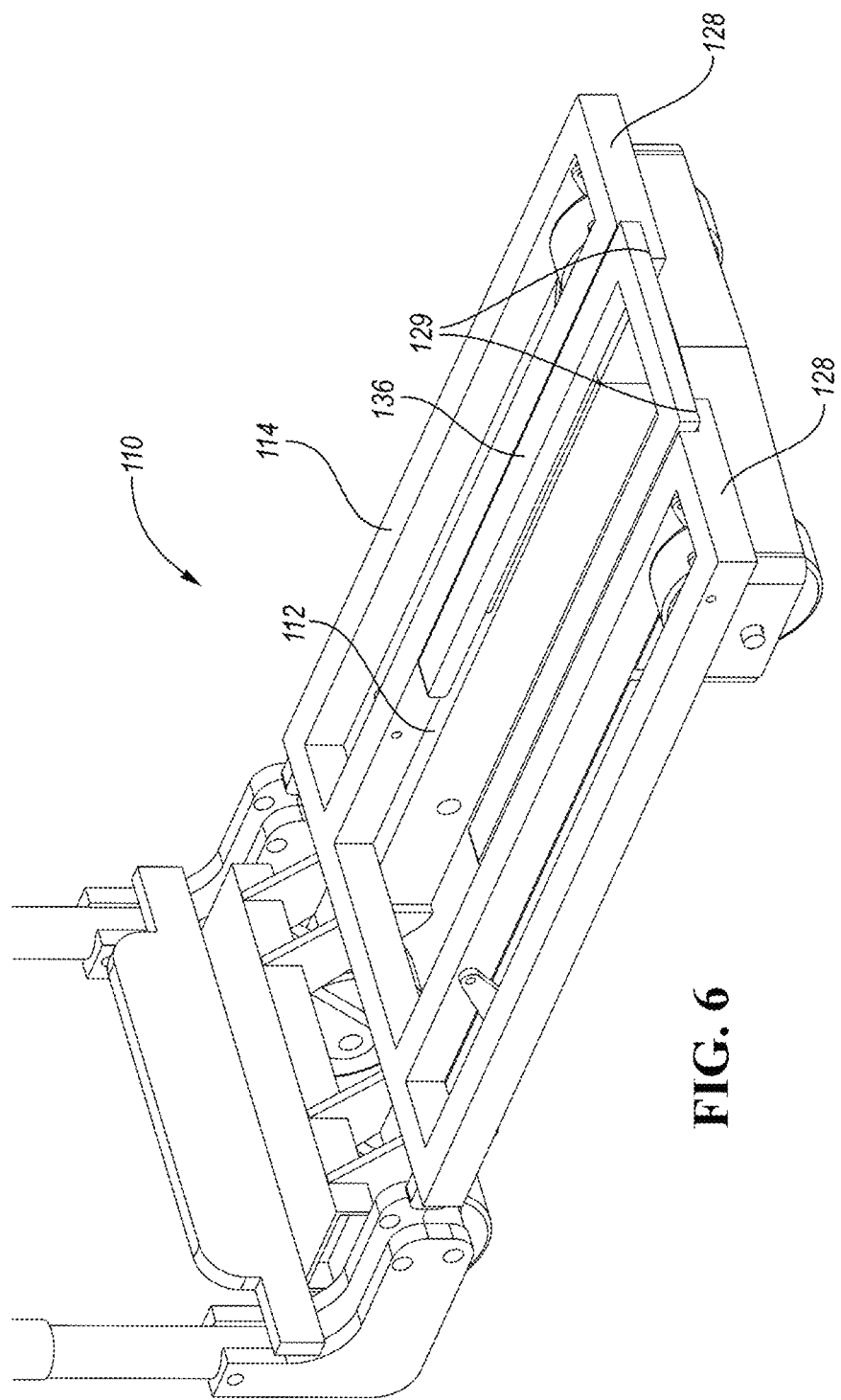
FIG. 6 shows the pallet sled of FIG. 5 with the frame extension moved to a retracted position.

As shown in FIG. 6, the frame extension 136 can be slid relative to the upper frame 114 to a retracted position (shown) completely or almost completely between the arms 128 of the upper frame 114. This substantially shortens the length of the upper frame 114 of the sled 110 for transport and storage.

Figure 7:
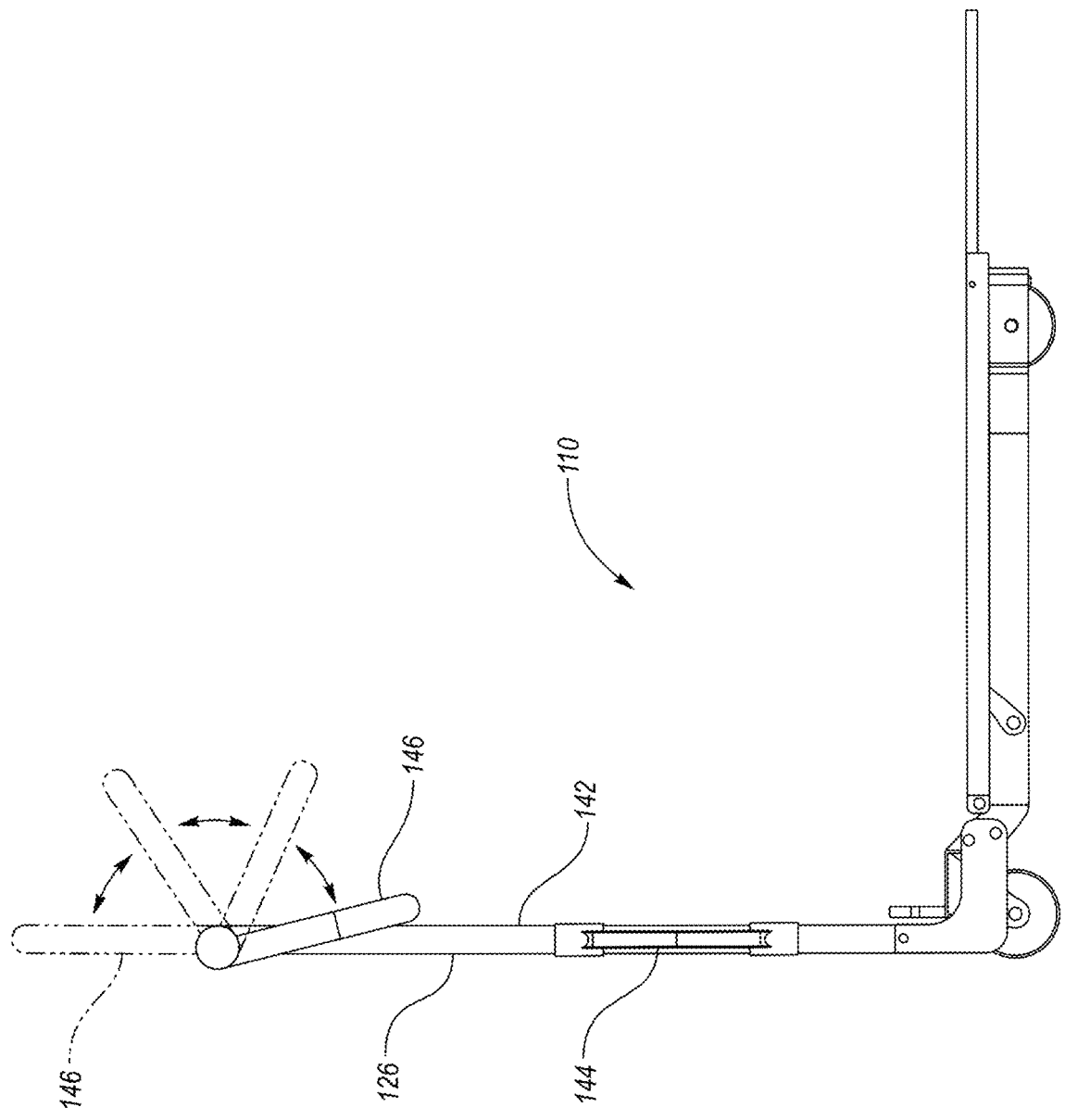
FIG. 7 is a side view of the pallet sled of FIG. 4 showing different positions of the handle extension.

FIG. 7 shows that the handle extension 146 can be selectively pivoted from the extended position (shown in broken lines) to a retracted position against the vertical portions 142 of the handle 126. In the extended position, leverage on the handle 126 is maximized to facilitate raising the upper frame 114 with a pallet loaded thereon. In the retracted position, the sled 110 can be more easily stored and transported.

Figure 8:
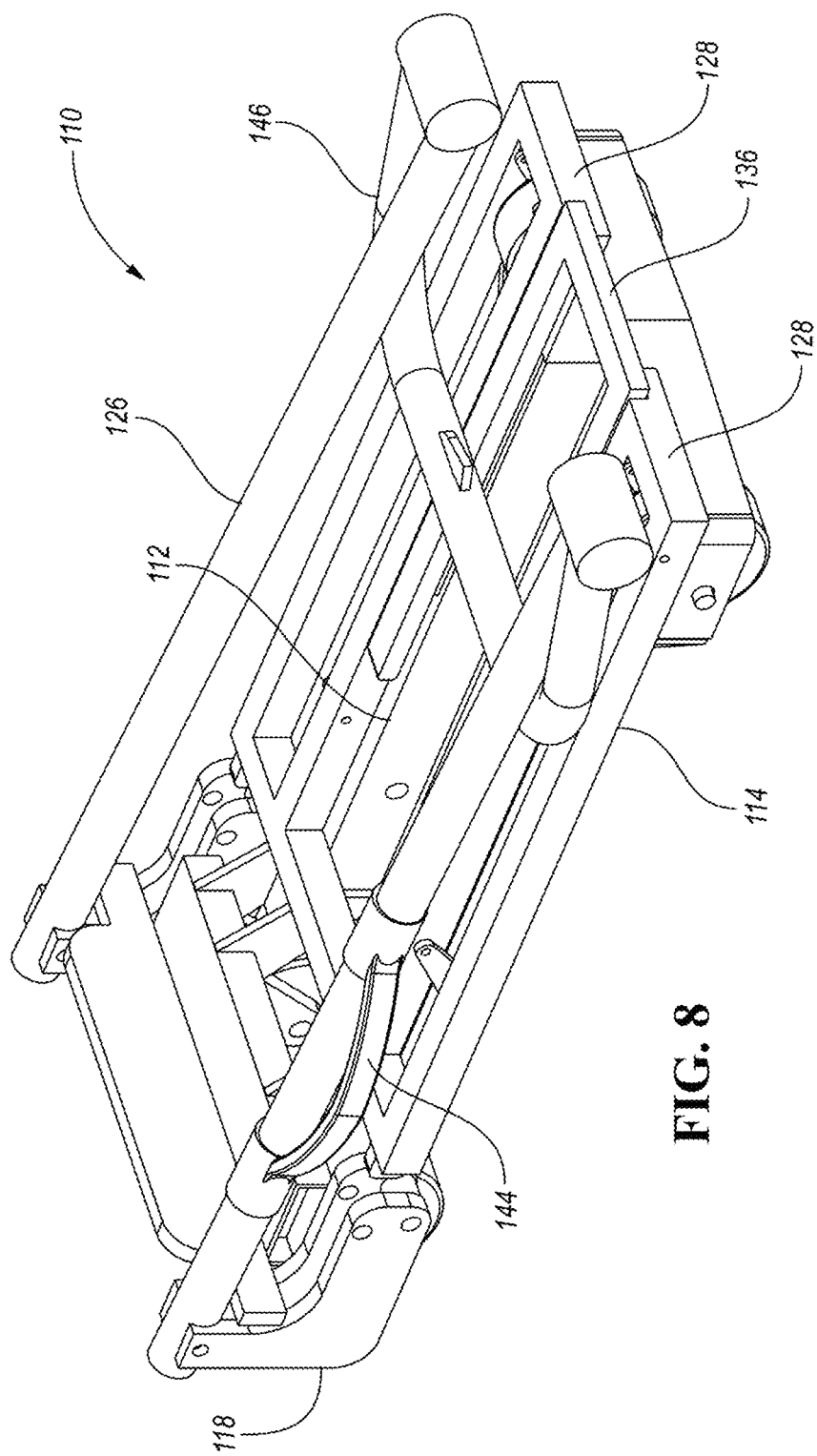
FIG. 8 is a perspective view of the pallet sled of FIG. 4 with the handle extension retracted, the handle folded and the frame extension retracted.

In FIG. 8, the frame extension 136 is in the retracted position. The handle extension 146 is in the retracted position. The handle 126 is also folded down onto the upper frame 114 to facilitate transport and storage of the sled 110.

Figure 9:
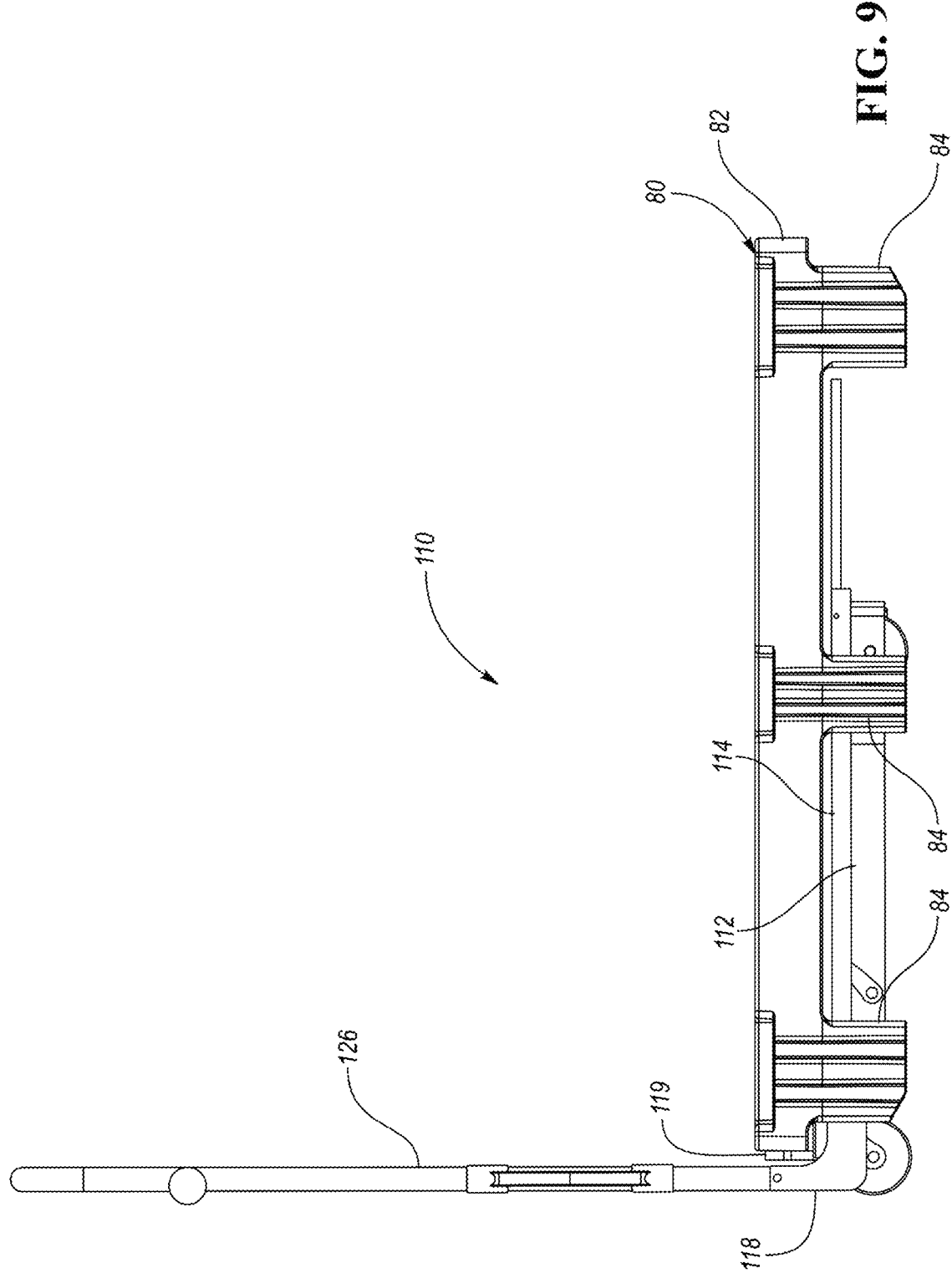
FIG. 9 is a side view of the pallet sled of FIG. 4 with the upper frame in a lower position and positioned below a pallet.

As shown in FIG. 9, in use the upper frame 114 and lower frame 112 are positioned under the deck 82 of a pallet 80 between the columns 84. The deck 82 of the pallet 80 may abut the forward plate 119 of the base 118. By pivoting the handle 126, the user can cause the upper frame 114 to rise upward relative to the lower frame 112 to lift the pallet 80 off the floor. The pallet 80 can then be rolled with the sled 110.

Figure 11:
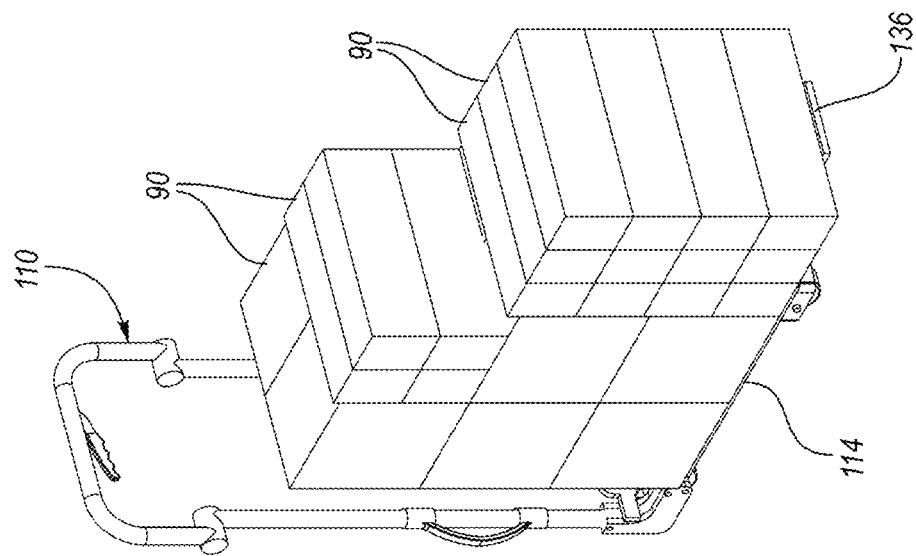
FIG. 11 is a perspective view of the pallet sled and goods of FIG. 10.
Figure 10:
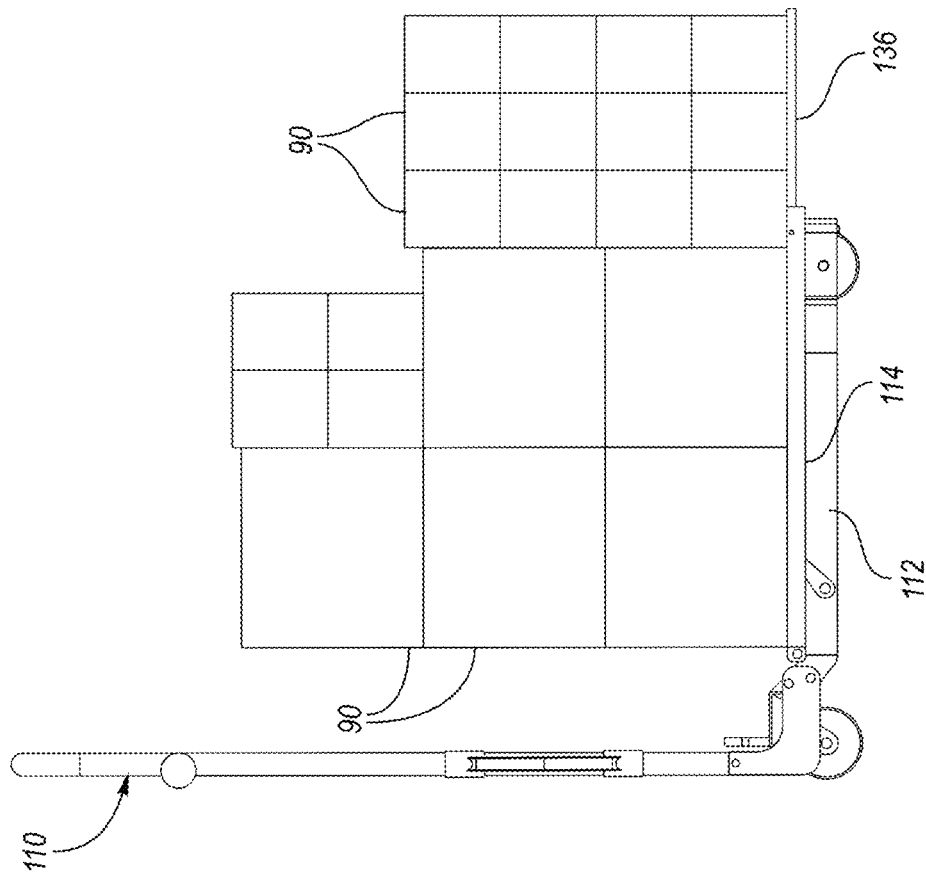
FIG. 10 is a side view of the palled sled of FIG. 4 with goods stacked thereon without a pallet.

As shown in FIGS. 10 and 11, the palled sled 110 could also be used to move goods 90 without a pallet. As shown, the goods 90 can be placed directly on the upper frame 114 and the frame extension 136.

Figure 12:
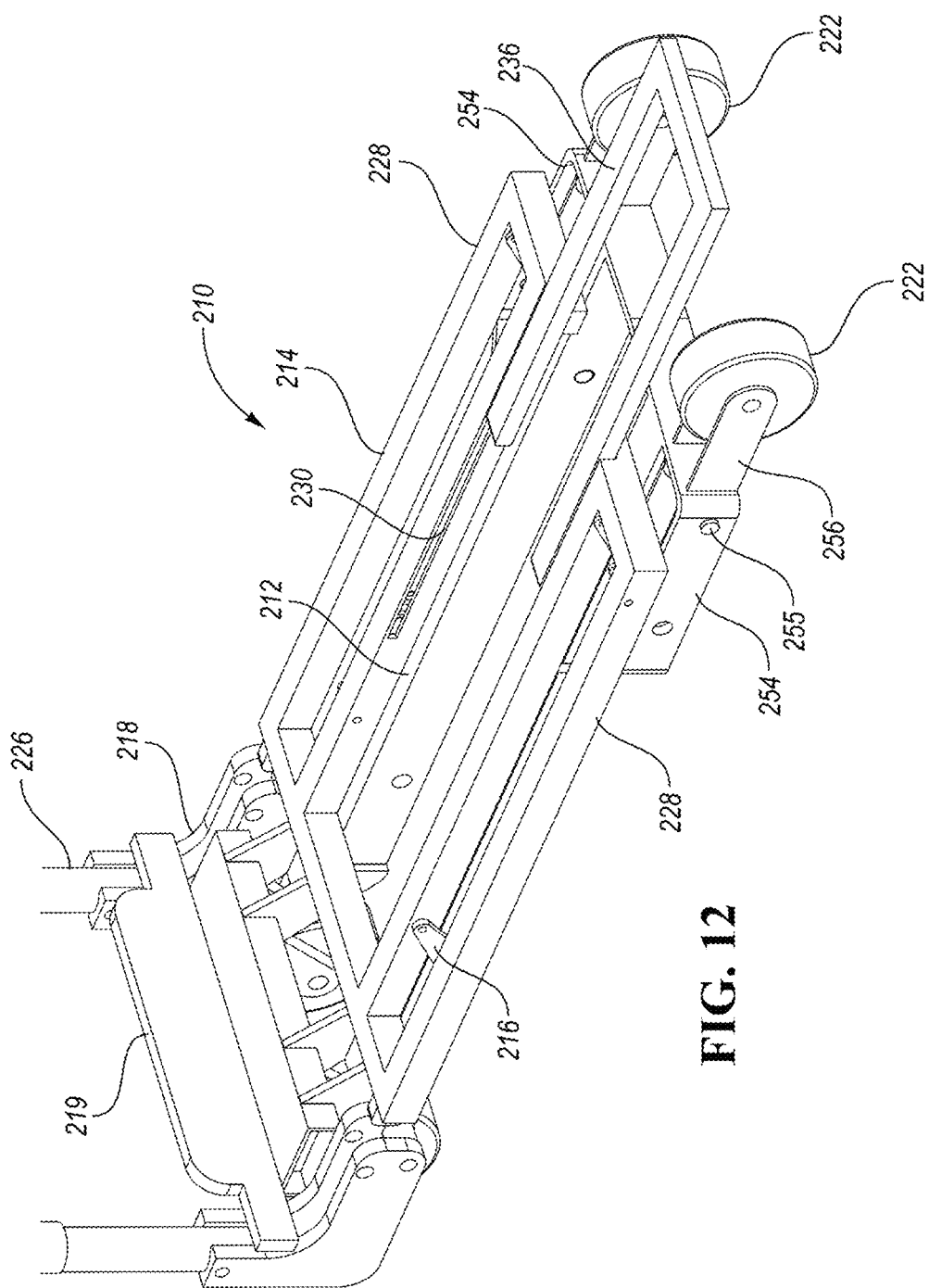
FIG. 12 shows the upper frame and lower frame of a pallet sled according to a third embodiment with the wheels in an extended position.
Figure 13:
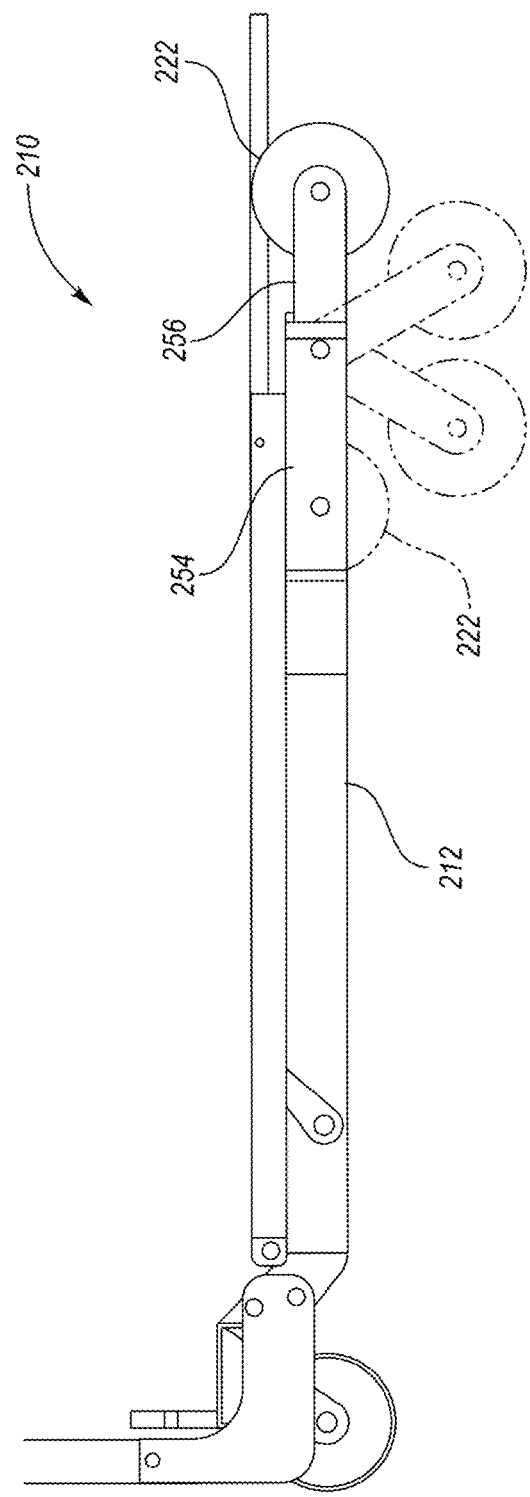
FIG. 13 is a side view of the upper frame and lower frame of FIG. 12 showing the different positions of the wheels.
Figure 14:
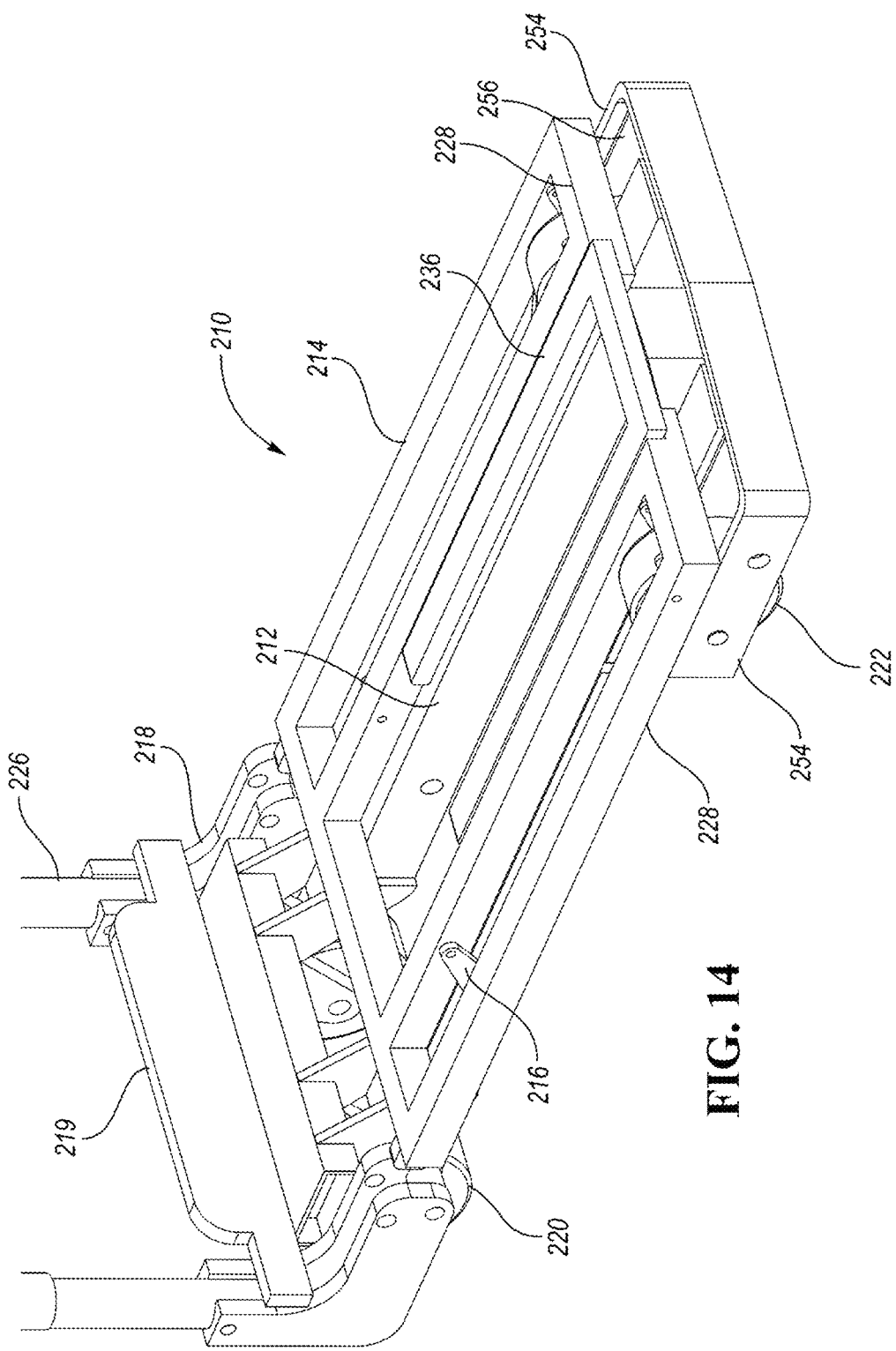
FIG. 14 is a perspective view of the upper frame and lower frame of FIG. 12 with the wheels in the retracted position.

FIGS. 12-14 show a pallet sled 210 according to another embodiment. The pallet sled 210 includes a lower frame 212 and upper frame 214 connected by pivot arms 216. The upper frame 214 can be raised and lowered relative to the lower frame 212 by the user to lift a pallet. The lower frame 212 includes a base 218 at a forward end of the sled 210. Wheels 220 support the base 218.

A handle 226 extends upward from the base 218. The handle 226 is used to raise and lower the upper frame 214 relative to the lower frame 212, and to move the sled 210. The handle 226 could be similar to the handles of the other embodiments (i.e. extendable or not). The base 218 may include a vertical forward plate 219.

The upper frame 214 includes a pair of spaced-apart arms 228. A frame extension 236 is shown in FIG. 12 in the extended position, mostly rearward of and partially between the arms 228 of the upper frame 214. In this embodiment, the frame extension 236 is slidably or telescopically connected to the upper frame 214, but the hinged connection of FIG. 1 could also be used. The frame extension 236 may be slidably supported in channels 230 on opposing faces of the arms 228 of the upper frame 214 and slidably supported on ledges 229.

In this embodiment, the wheels 222 supporting the rearward end of the lower frame 212 are mounted to wheel extensions 256 that are pivotably secured via a pivot axis 255 to brackets 254 secured to the lower frame 212. In FIG. 12, the wheels 222 are shown in their extended position, rearward of the arms 228 of the upper frame 214 and below the frame extension 236 in the extended position. In this manner, the wheels 222 are aligned with the frame extension 236 for increased stability.

As shown in FIG. 13, the wheel extensions 256 are pivotable about the axes 255 relative to the lower frame 212 between an extended position where the wheels 222 are rearward of the arms 228 of the lower frame 212 and a retracted position (shown in broken lines) where the wheels 222 are within the envelope of the arms 228 of the lower frame 212.

FIG. 14 shows the sled 210 with the frame extension 236 moved to the retracted position and with the wheel extensions 256 moved to their retracted positions, such that the frame extension 236 and the wheels 222 are within the envelope of the arms 228 of the upper frame 214. The handle 226 can then be folded down onto the upper frame 214 as well, as before. This provides a compact package for transport and storage.

Figure 15:
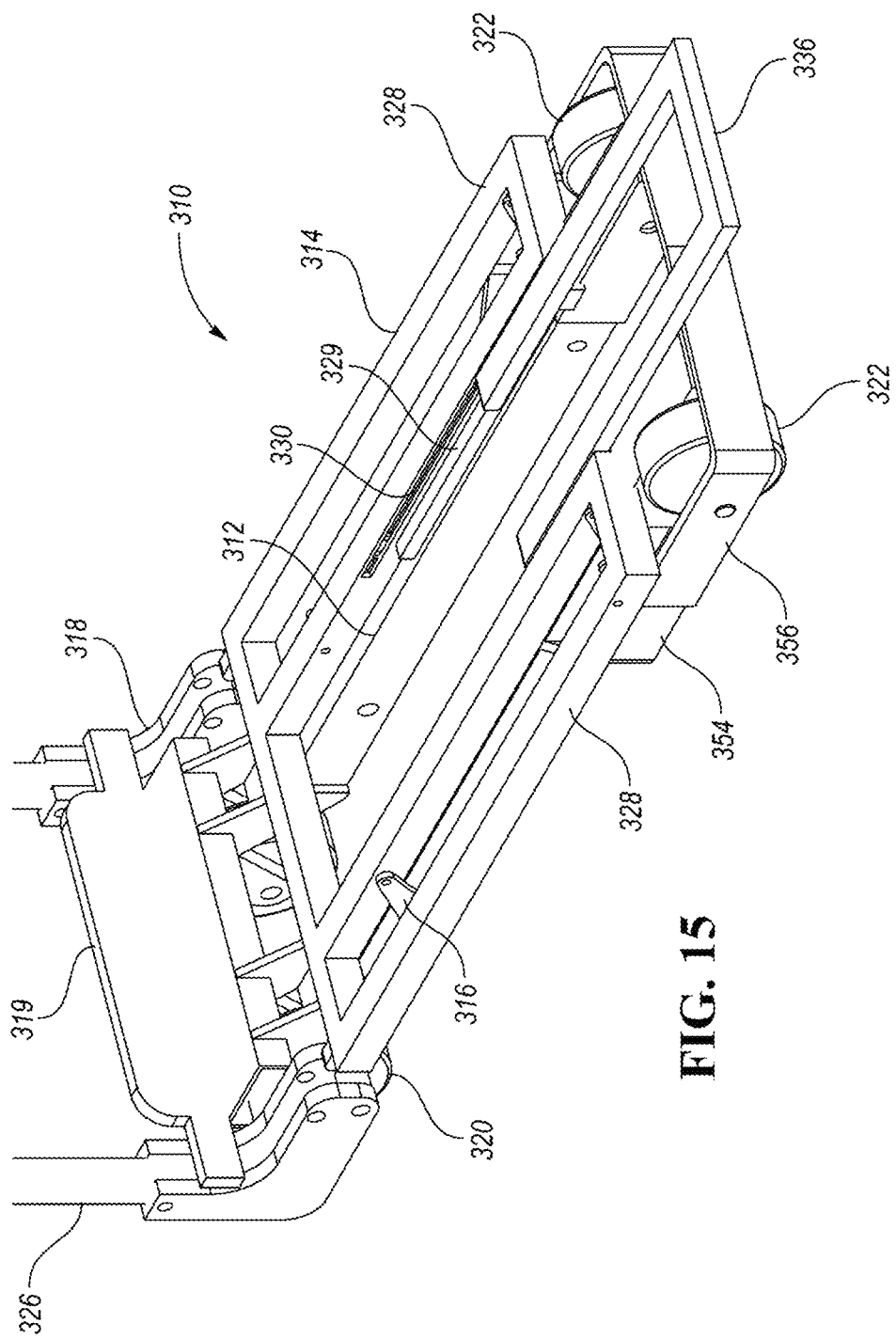
FIG. 15 shows the upper frame and lower frame of a pallet sled according to a fourth embodiment with the wheels in an extended position.
Figure 17:
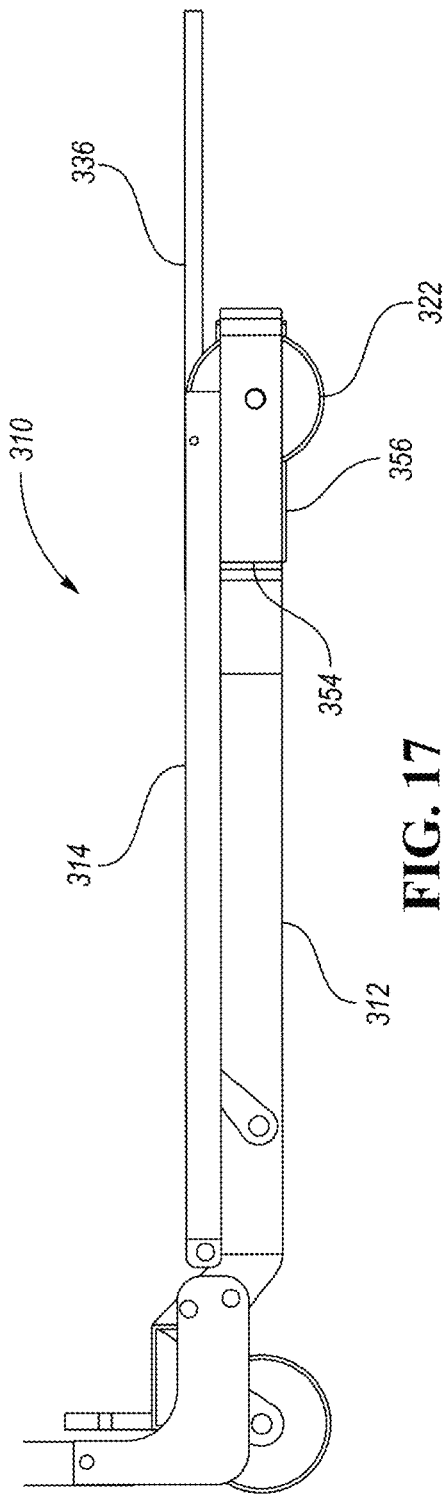
FIG. 17 is a side view of the upper frame and lower frame of FIG. 15 with the wheels in a retracted position.
Figure 16:
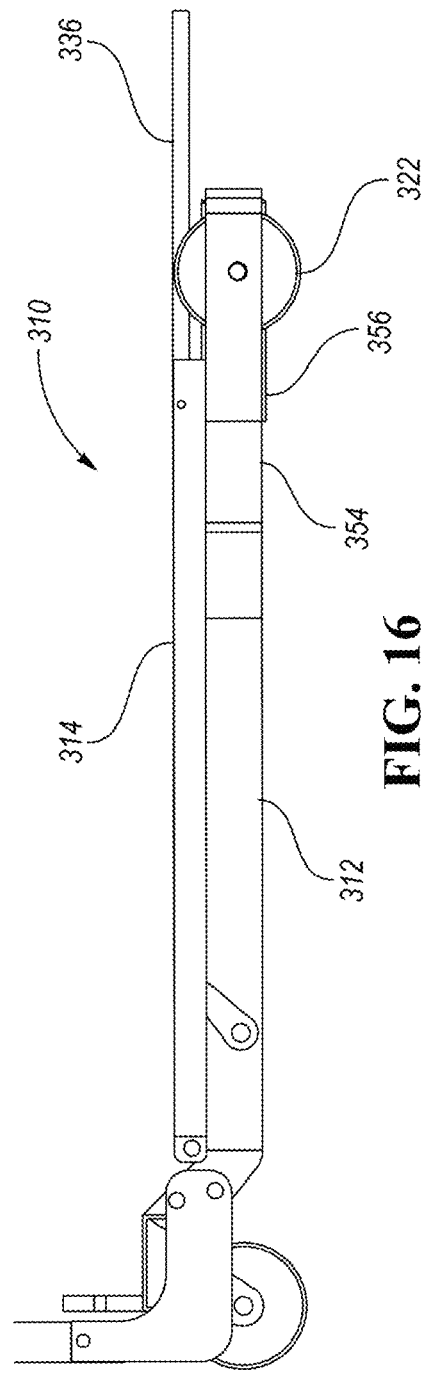
FIG. 16 is a side view of the upper frame and lower frame of FIG. 15.

FIGS. 15-17 show a pallet sled 310 according to another embodiment. The pallet sled 310 includes a lower frame 312 and upper frame 314 connected by pivot arms 316. The upper frame 314 can be raised and lowered relative to the lower frame 312 by the user to lift a pallet. The lower frame 312 includes a base 318 at a forward end of the sled 310. Wheels 320 support the base 318.

A handle 326 extends upward from the base 318. The handle 326 is used to raise and lower the upper frame 314 relative to the lower frame 312, and to move the sled 310. The handle 326 could be one of the handles disclosed in other embodiments. The base 318 may include a vertical forward plate 319.

The upper frame 314 includes a pair of spaced-apart arms 328. The arms 328 open rearwardly of the sled 310. A frame extension 336 is shown in FIG. 15 in the extended position, mostly rearward of and partially between the arms 328 of the upper frame 314. In this embodiment, the frame extension 336 is slidably or telescopically connected to the arms 328 of the upper frame 314, but the hinged connection of FIG. 1 could also be used. The frame extension 336 may be slidably supported in channels 330 on opposing faces of the arms 328 of the upper frame 314 and slidably supported on ledges 329.

In this embodiment, the wheels 322 supporting the rearward end of the lower frame 312 are mounted to wheel extensions 356 that are slidably secured such as via interlocking pins, etc, to brackets 354 secured to the lower frame 312. In FIGS. 15 and 16, the wheels 322 are shown in their extended position, rearward of the arms 328 of the upper frame 314 and below the frame extension 336 in the extended position. In this manner, the wheels 322 are aligned with the frame extension 336 for increased stability.

The wheel extensions 356 are slidable relative to the lower frame 312 between an extended position (FIG. 16) where the wheels 322 are rearward of the arms 328 of the lower frame 312 and a retracted position (FIG. 17) where the wheels 322 are within the envelope of the arms 328 of the lower frame 312 (or substantially so or at least more so).

With the frame extension 336 moved to the retracted position and with the wheel extensions 356 moved to their retracted positions, and with the handle 326 folded down onto the upper frame 314, as before, the sled 310 provides a compact package for transport and storage.

FIGS. 18 and 19 show one lift mechanism that could be used with any of the sleds disclosed above. The sled 410 includes an upper frame 414 and a lower frame 412. A ratchet mechanism 460 is selectively engaged by the handle 426. The ratchet mechanism 460 is connected to the upper frame 414, such that pivoting the handle 426 downward and forward (FIG. 19) causes the upper frame 414 to rise relative to the lower frame 412. In this manner, a pallet can be selectively lifted by any of the sleds, moved by the sled and selectively lowered to the floor.

Figure 20:
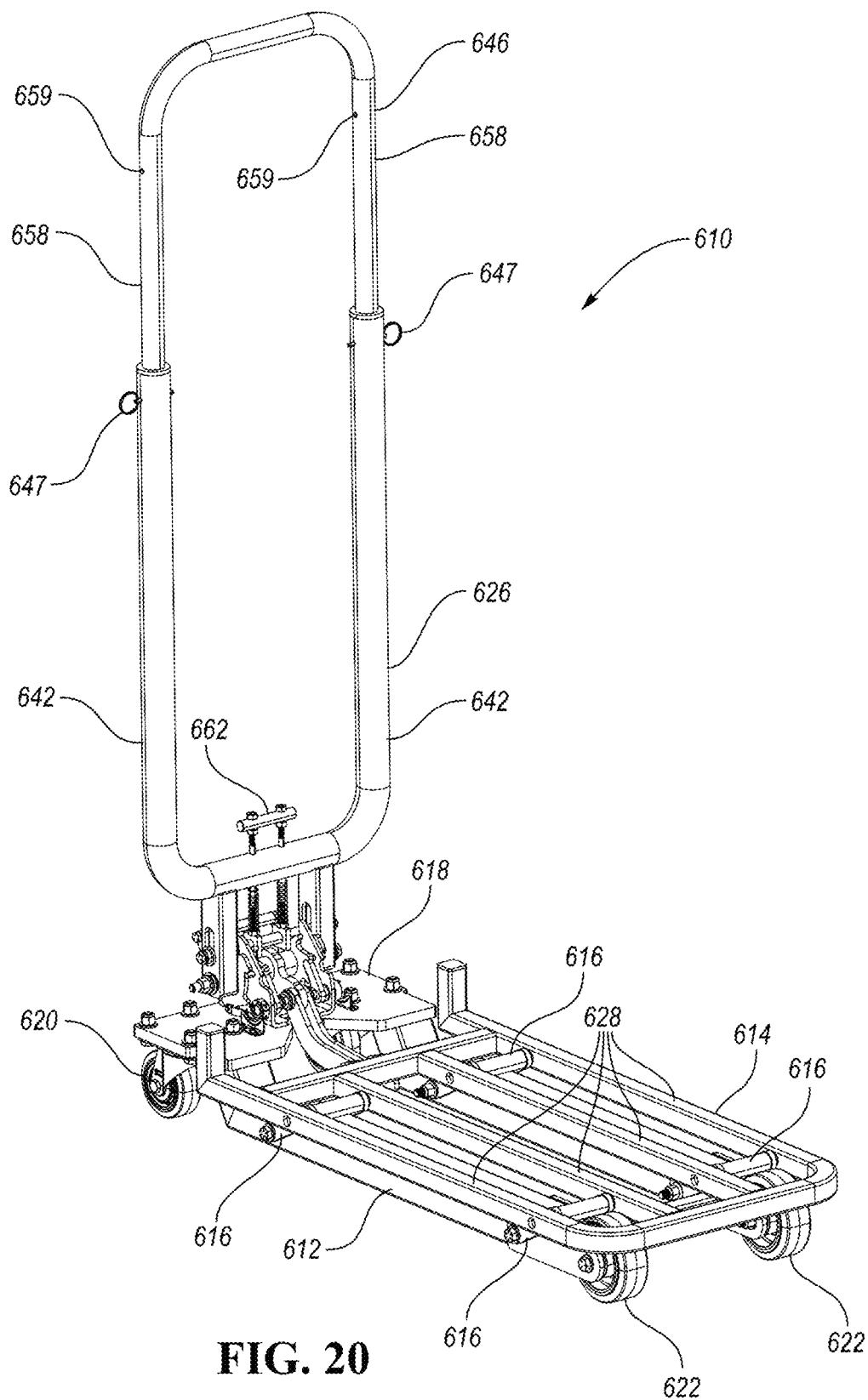
FIG. 20 is a perspective view of a pallet sled according to another embodiment.

A pallet sled 610 according to another embodiment is shown in FIG. 20. The pallet sled 610 includes a lower frame 612 and upper frame 614 connected by pivot arms 616. The upper frame 614 can be raised and lowered relative to the lower frame 612 by the user to lift a pallet. The lower frame 612 includes a base 618 at a forward end of the sled 610. Wheels 620 support the base 618. Wheels 622 support the rearward end of the lower frame 612.

A handle 626 extends upward from the base 618. The handle 626 is used to raise and lower the upper frame 614 relative to the lower frame 612. The handle 626 is also used to move the sled 610.

The upper frame 614 includes a plurality of spaced-apart rails 628. The handle 626 includes vertical portions 642 extending upward from the base 618. In this embodiment, the handle 626 includes a handle extension 646 forming an upper end thereof. The handle extension 646 includes a pair of vertical portions telescopically joined to the vertical portions 642 and connected by a cross-bar. The vertical portions of the handle extension 646 are releasably secured by pins 647 (or another suitable locking mechanism) received in apertures 659 through the vertical portions 658 of the handle extension 646 (retracted apertures 659 are visible, but in FIG. 20, the pins 647 are positioned in the extended apertures (not visible)).

A catch bar release handle 662 is spring-biased toward a locked position. The catch bar release handle 662 secures the bottom of the handle 626 to the base 618.

Figure 22:
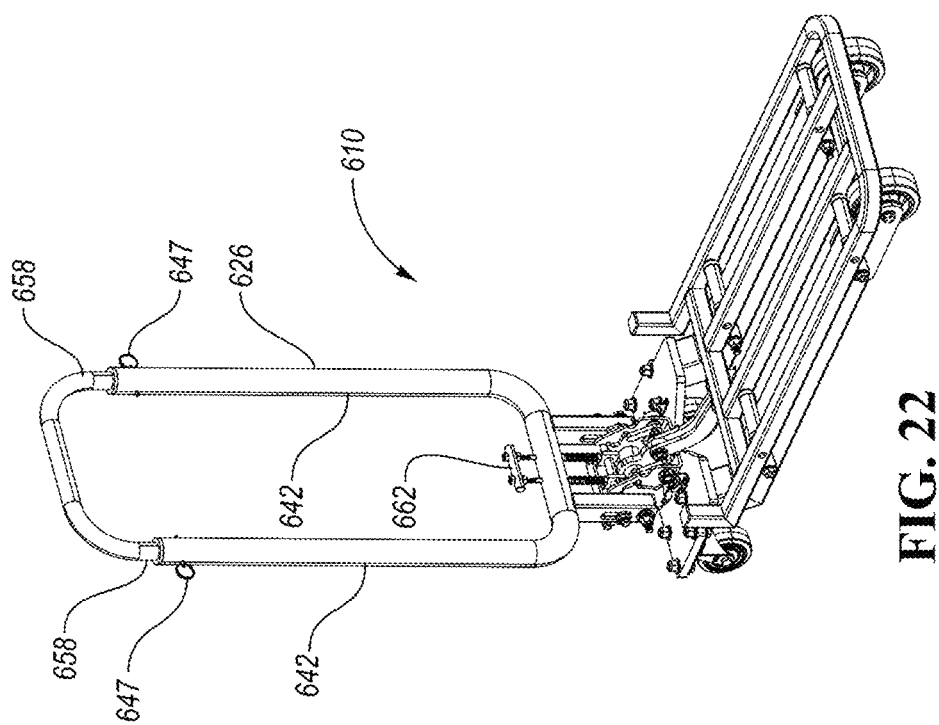
FIG. 22 shows the pallet sled of FIG. 20 with the handle in the retracted position.
Figure 21:
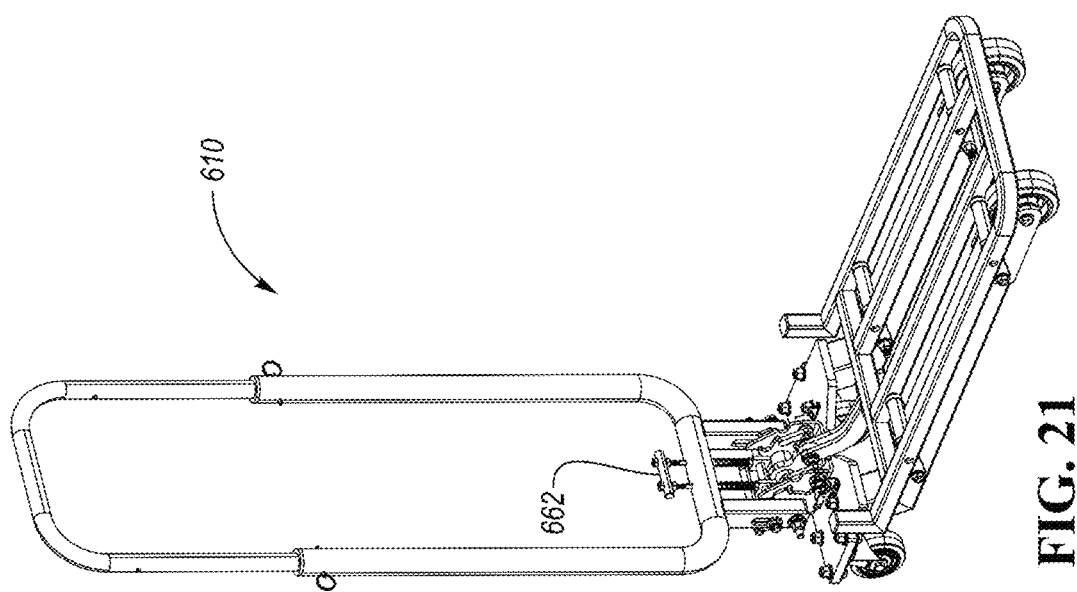
FIG. 21 shows the pallet sled of FIG. 20 with the handle in the extended position.
Figure 24:
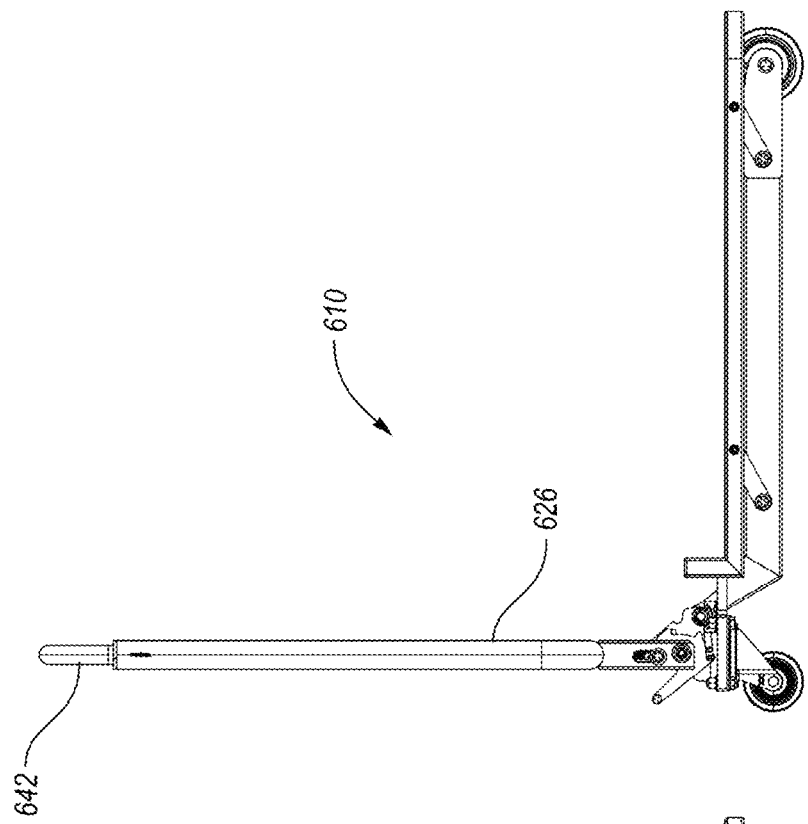
FIG. 24 shows the pallet sled of FIG. 20 with the handle in the retracted position.
Figure 23:
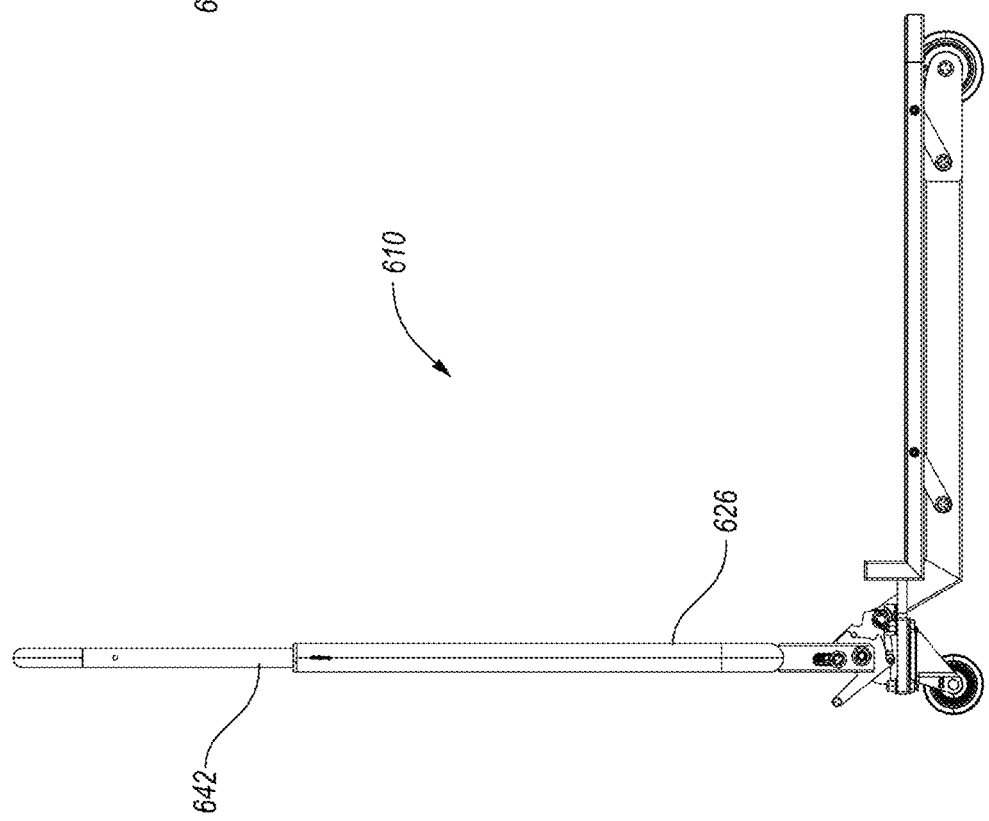
FIG. 23 is a side view of the pallet sled of FIG. 20 with the handle in the extended position.

The handle extension 646 is shown in FIGS. 20 and 21 in an extended position but if the pins 647 are released, the handle extension 646 can be slid downward relative to the vertical portions 642 to a retracted position. The retracted position is shown in FIG. 22. FIGS. 23 and 24 are side views of the extended and retracted positions of the handle extension 646.

Figure 26:
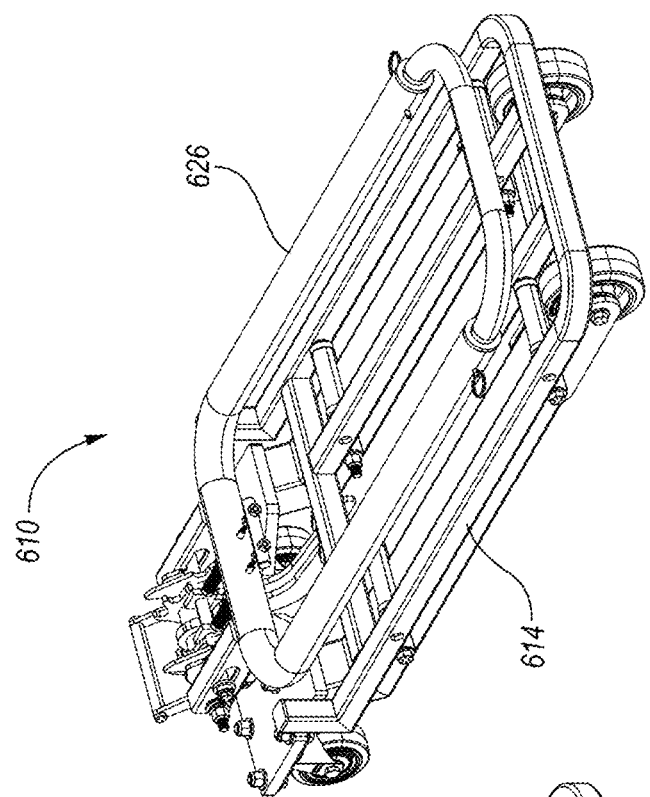
FIG. 26 shows the pallet sled of FIG. 20 with the handle folded down.
Figure 25:
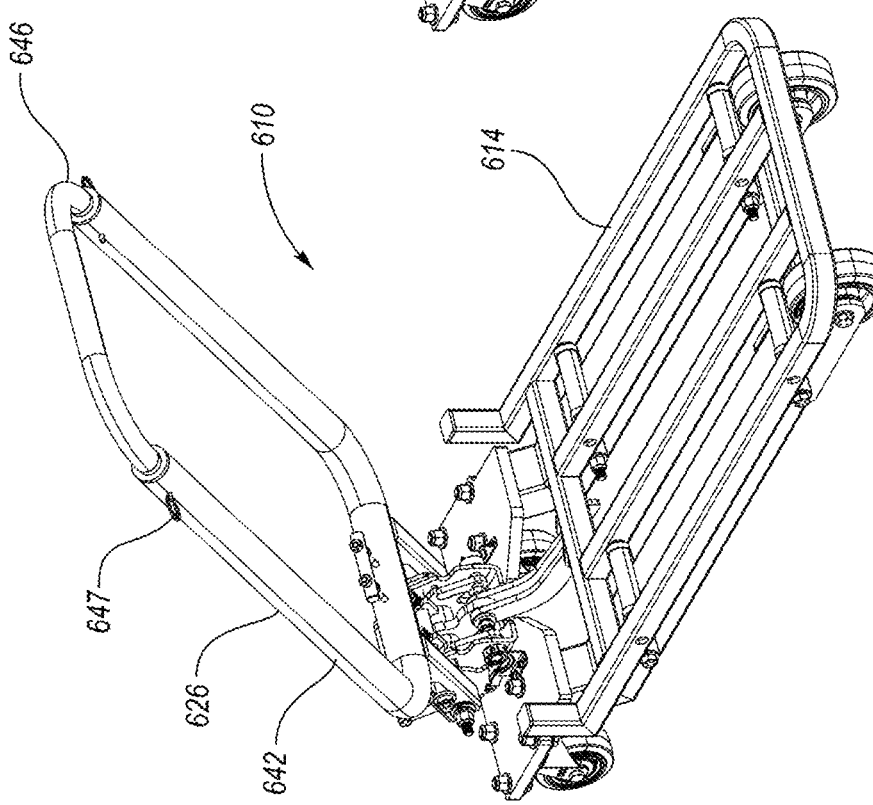
FIG. 25 shows the pallet sled of FIG. 20 with the handle in the process of being folded downward.

Referring to FIGS. 25 and 26, after the user pulls upward on the catch bar release handle 662, the handle 626 can be pivoted downward relative to the base 618. As shown in FIG. 26, the handle 626 can be pivoted to a position on the upper frame 614. In this compact position, with the handle extension 646 retracted and the handle 626 folded down onto the upper frame 614, the pallet sled 610 can be carried by a user, placed in a trunk of a car, stored, etc.

Figure 27:
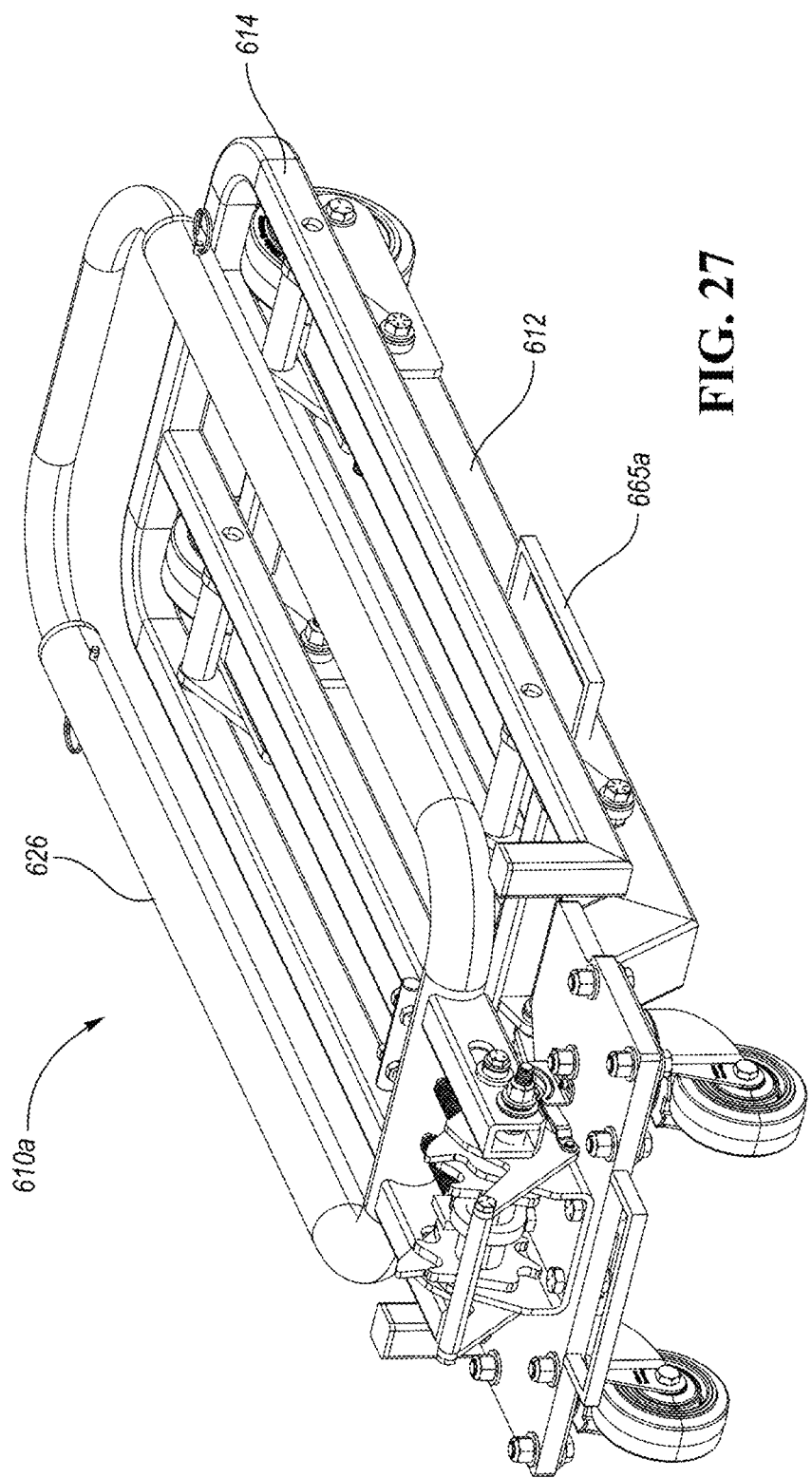
FIG. 27 shows a variation of the pallet sled of FIG. 20 with a carrying handle.

FIG. 27 shows a pallet sled 610a, which is a slight variation of that shown in FIG. 20. Being otherwise identical, the pallet sled 610a further includes a carrying handle 665a secured (such as by welding) to the outer surface of the lower frame 612. A user can easily lift and carry the pallet sled 610a by the handle 665a when the pallet sled 610a is in the folded position as shown. The carrying handle 665a could be secured to the lower frame of any of the embodiments herein.

Figure 29:
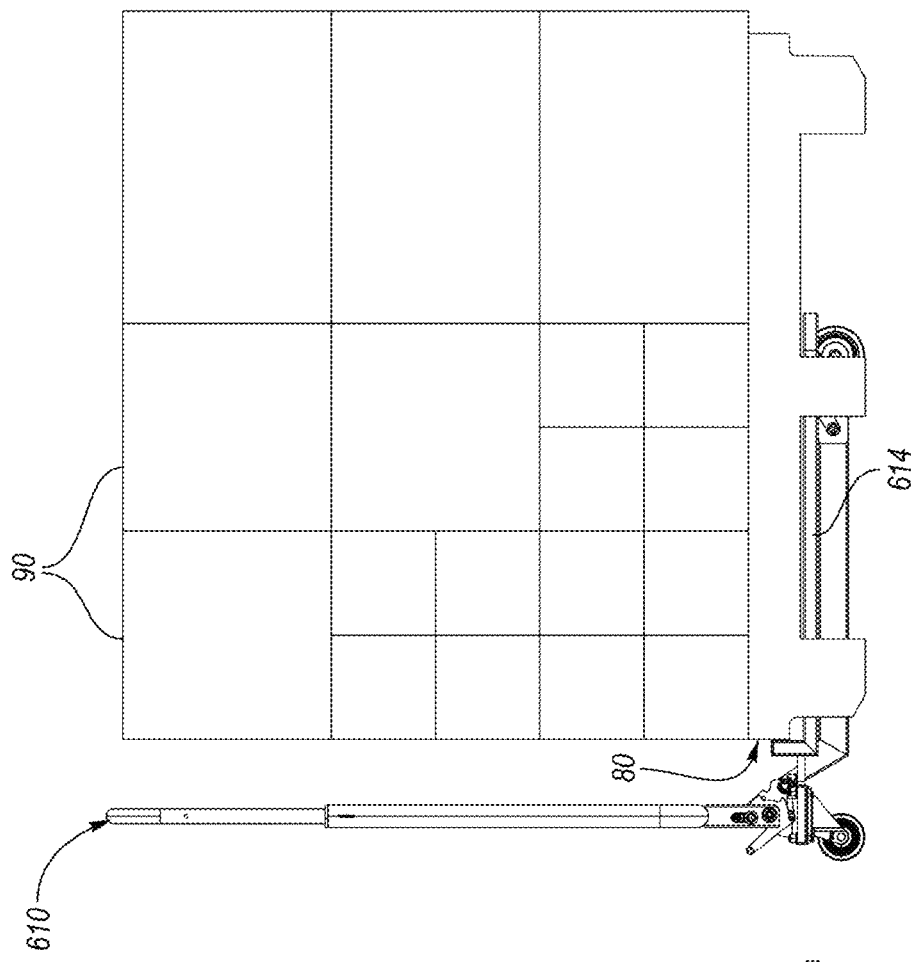
FIG. 29 is a side view of the pallet sled of FIG. 20 with products stacked on a pallet thereon.
Figure 28:
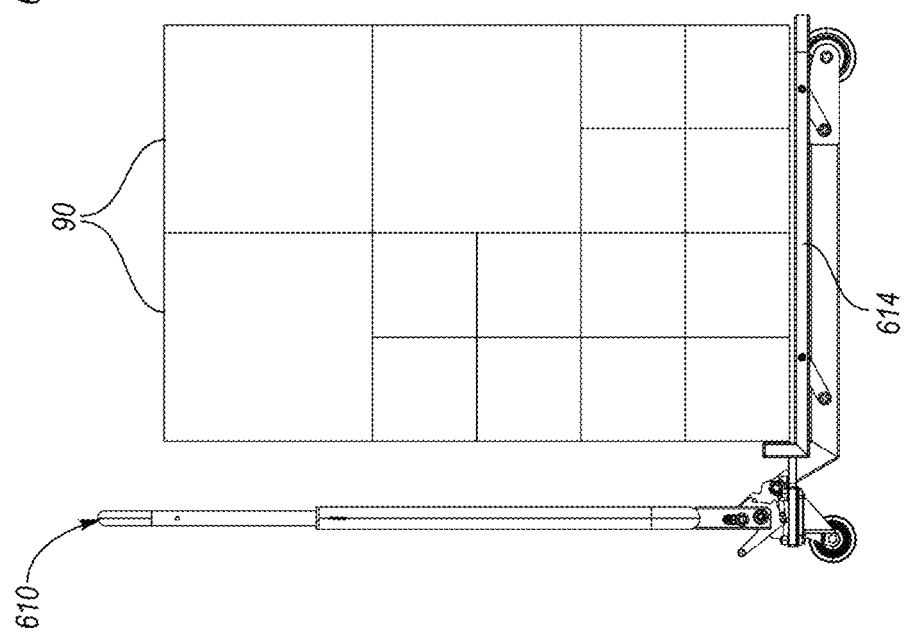
FIG. 28 is a side view of the pallet sled of FIG. 20 with products stacked directly thereon.

As shown in FIG. 28, the pallet sled 610 can be used to carry products 90 directly on the upper frame 614 of the pallet sled 610. As shown in FIG. 29, the pallet sled 610 can be used to carry a pallet 80 loaded with products 90, with the pallet 80 on the upper frame 614 of the pallet sled 610.

As shown in FIGS. 30-32, pivoting the handle 626 relative to the base 618 actuates a ratchet mechanism 660 to raise and lower the upper frame 614 relative to the lower frame 612 and the floor. When the handlebar 626 is rotated rearward to lift a load, the ratcheting mechanism 660 could be used to provide a force reduction in order to reduce the input force on the handlebar 626 required to lift a load. The mechanical advantage would be governed by the geometry of the ratchet mechanism 660.

The ratcheting mechanism 660 could also provide incremental lifting of the load and would allow a user-selectable lift height. The number of lift height positions would be controlled by the number of teeth on the ratcheting gear(s). User selectable lift heights would improve safety because in many scenarios the load may not need to be lifted to max height. Less work is required when lifting only as high as needed. Additionally, the load stability increases and time to lift decreases when the lifted height is reduced.

Referring to FIGS. 33-35, the variable heights of the upper frame 614 could be used when the pallet 80 is on the floor (FIG. 33), at a low raised height (FIG. 34) or at a high raised height (FIG. 35). In FIG. 34, the pallet 80 is lifted only slightly off the floor. In FIG. 35 the pallet 80 is lifted higher off the floor.

Figure 36:
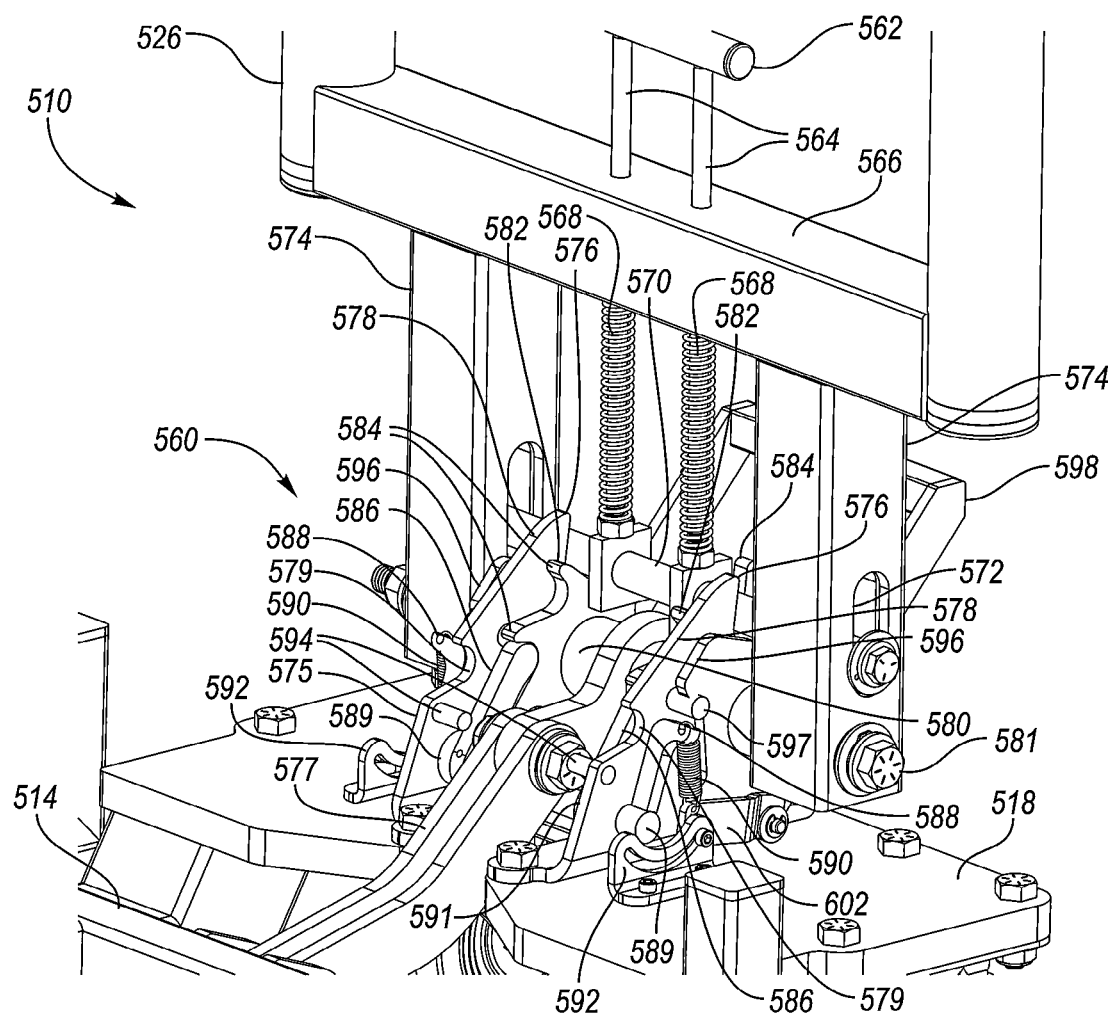
FIG. 36 shows a ratchet mechanism of another pallet sled similar to that of FIG. 20 in more detail.

FIG. 36 shows a ratchet mechanism 560 in greater detail on another pallet sled 510; however, the ratchet mechanism 560 could be used on the pallet sled 610 of FIG. 20 or any of the pallet sleds disclosed herein. The ratchet mechanism 560 shown utilizes two symmetrical ratchet gears 582 with a plurality of teeth 584 spaced 45 degrees. Teeth 584 of somewhat different spacing could be used depending on the application. The gears 582 are secured to one another via a shaft 580 which transfers input force from the gears 582 and the handlebar 526 to the tension links 577 which pull the upper frame 514 upwards and forwards, lifting the load.

The handlebar 526 includes a lower crossbar 566 having two rods 564 slidably captured therein. Two lower vertical beams 574 extend downward from the lower crossbar 566. A catch bar release handle 562 connects the two rods 564 at upper ends thereof. A spring 568 receives each of the two rods 564 below the lower crossbar 566 and biases the rods 564 downward away from the lower crossbar 566. A catch bar 570 connects lower ends of the rods 564 and extends outward into a slot 572 in each of the lower vertical beams 574 of the handlebar 526. The catch bar 570 is slidably captured in the slots 572 and biased downward by the springs 568.

A ratchet cage 575 is fixed to the base 518 and has two upstanding flanges 578, each having an upper projection 576. In FIG. 36, the catch bar 570 is forward of the upper projections 576. Each upstanding flange 578 also includes a lower notch 579 rearward of the upper projection 576. The vertical beams 574 of the handlebar 526 are rotatably secured to the upstanding flanges 578 by a bolt 581. The gears 582 and the shaft 580 are also rotatable about the bolt 581.

A pawl 586 is pivotably mounted to an inner surface of each upstanding flange 578 rearward of the shaft 580 and positioned to engage the teeth 584 of the associated gear 582. The pawls 586 are each fixedly mounted to a pawl shaft 589 that is rotatably mounted to the upstanding flange 578, and connected by a rod 591 such that the pawls 586 pivot together. Outward of the upstanding flanges 578 are pawl arms 588 also fixed to the pawl shafts 589, such that the pawls 586 and the pawl arms 588 all pivot together. Each of a pair of pawl springs 590 is secured at one end to an outer end of one of the pawl arms 588.

The lower end of each pawl spring 590 is secured to a release link 602. The release link 602 is slidably captured by a curved track 592 (thereby also capturing the end of the pawl spring 590). The curved track 592 is concave, opening upward of the base 518. Stop pins 594 project inward from the upstanding flanges 578 to limit rearward motion of the pawls 586.

A foot pedal 598 includes a pair of outer plates 596 also pivotably mounted on the bolt 581. The outer plates 596 are positioned outward of the upstanding flanges 578 and inward of the vertical beams 574. Stop pins 597 project outward from the upstanding flanges 578 and engage the outer plates 596 at either extreme rotational position of the foot pedal 598. Each release link 602 is also connected to the outer plate 596, thus connecting the outer plate 596 to the lower end of the pawl spring 590.

Figure 37:
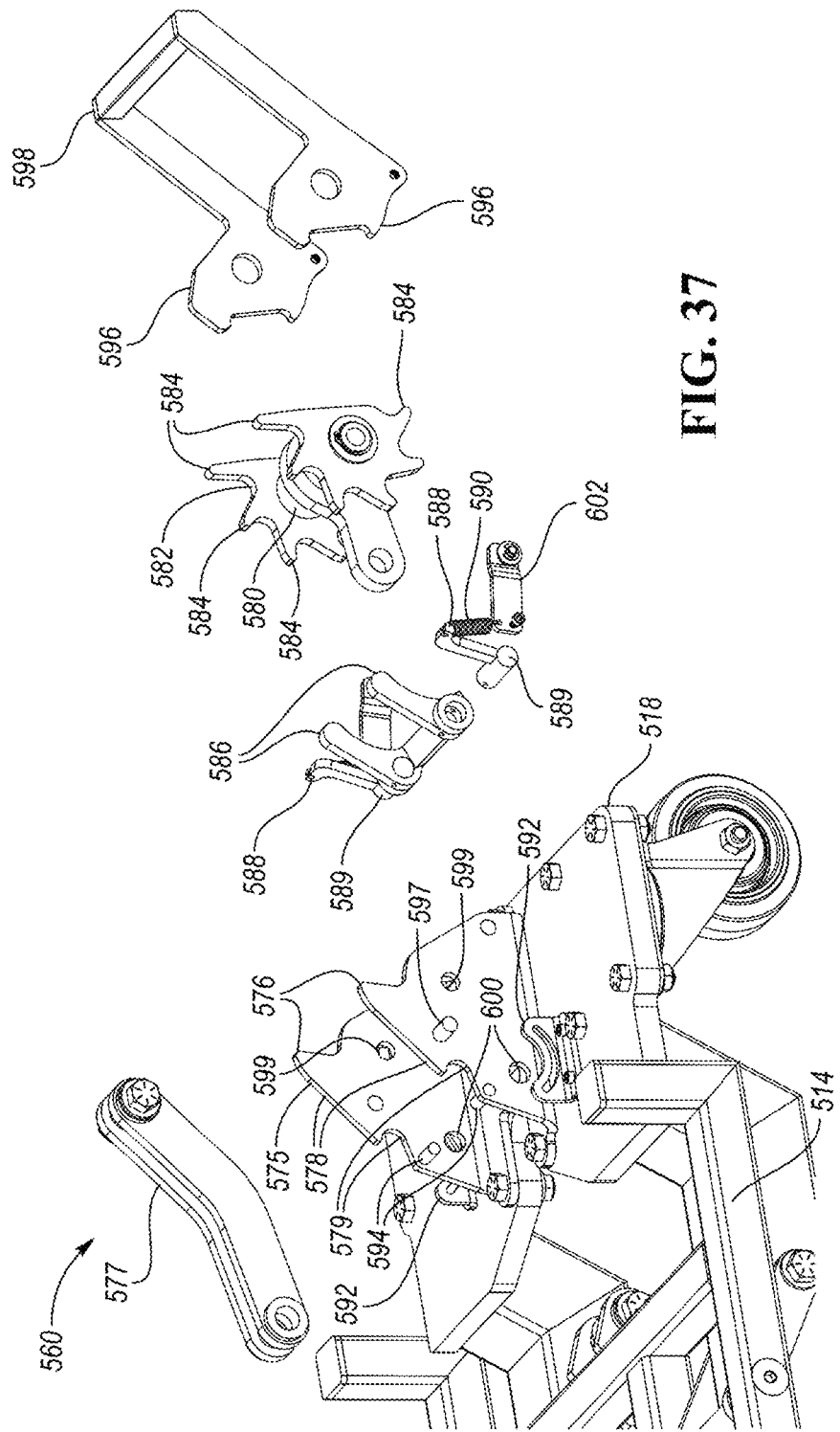
FIG. 37 is a partially exploded view of the ratchet mechanism of FIG. 36.

FIG. 37 is an exploded view of the ratchet mechanism 560 without the handlebar 526. The ratchet cage 575 is secured to an upper surface of the base 518. The curved tracks 592 are secured to the base 518 outward of the ratchet cage 575. Aligned apertures 599 are formed through the upstanding flanges 578 for receiving the bolt 581 (FIG. 36). Rearward apertures 600 through the upstanding flanges 578 are aligned to receive the pawl shafts 589. The lower notch 579 in each upstanding flange 578 is rearward of the upper projection 576 and the pins 597.

The lower end of each pawl spring 590 is secured to one of the release links 602. The release link 602 is configured to be captured by the curved track 592 (thereby also capturing the end of the pawl spring 590). Each release link 602 is also configured to be connected to the outer plate 596.

As shown in FIG. 37, the gears 582 are secured to one another by the shaft 580. Each gear 582 in this example includes six teeth, spaced approximately 45 degrees apart.

Figure 38:
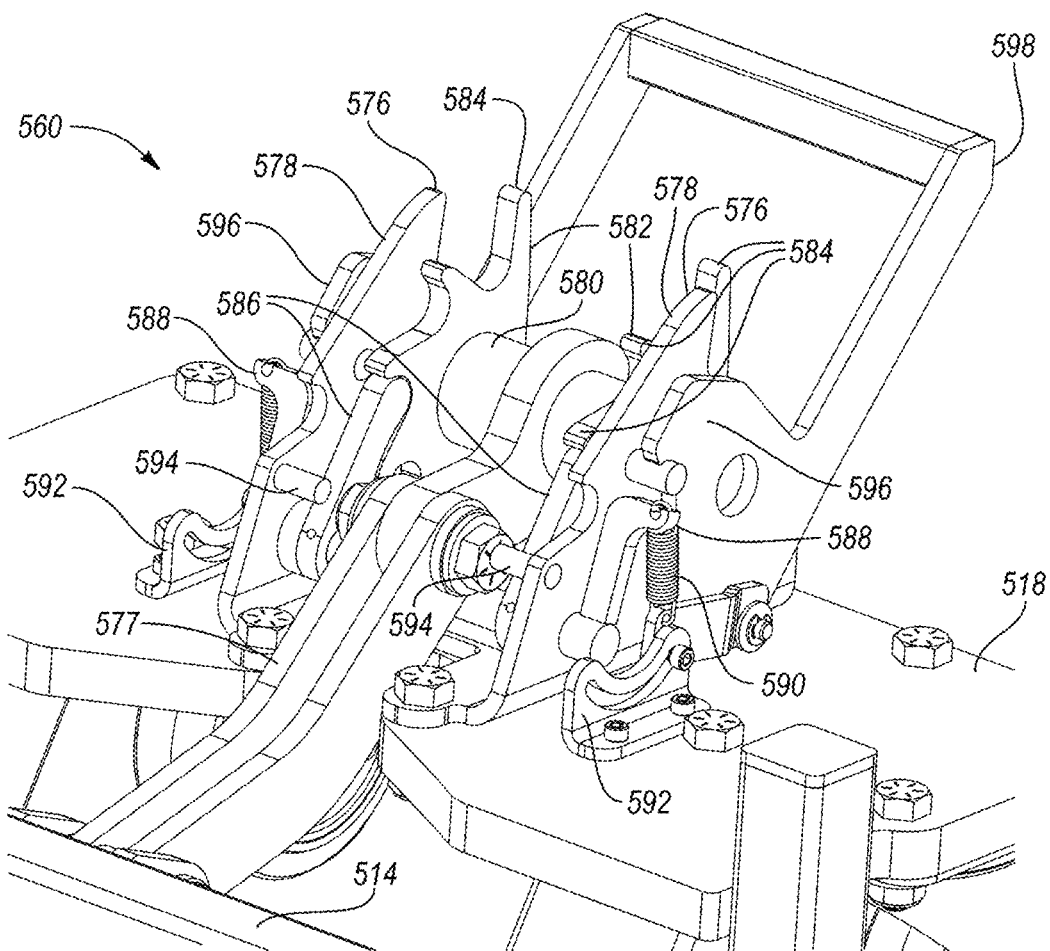
FIG. 38 is an enlarged view of the ratchet mechanism of FIG. 36 with the handlebar removed.

FIG. 38 shows the ratchet mechanism 560 without the handlebar 526 for clarity. The pawl springs 590 are in a forward position in the curved track 592, thereby biasing the pawls 586 toward the gears 582. The pawls 586 are positioned below teeth 584 on the gears 582 thereby preventing the upper frame 514 from moving downward. The teeth 584 are all inclined in the same direction, i.e. in the direction of rotation that corresponds to the frame 514 moving downward.

Figure 39:
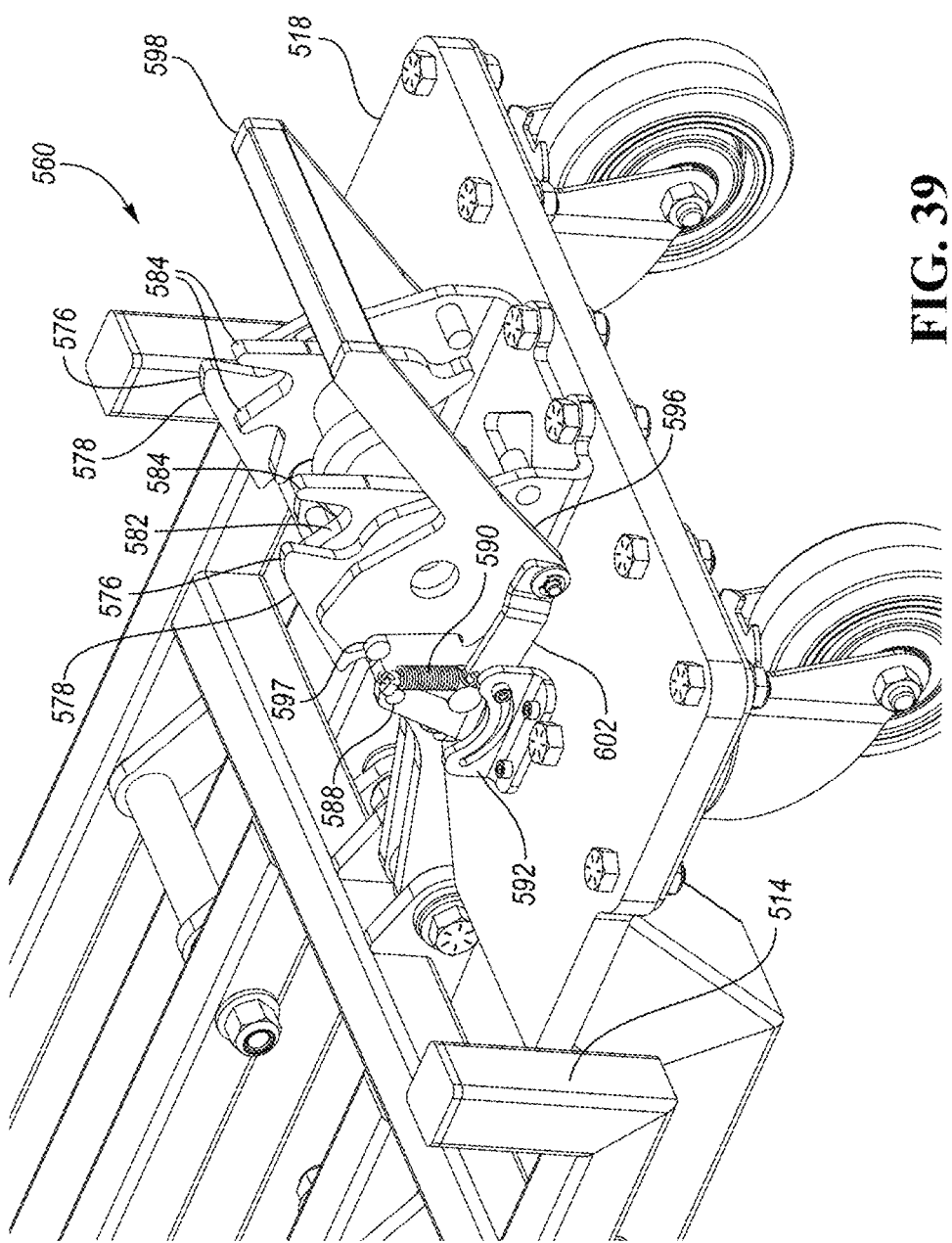
FIG. 39 is a front perspective view of the ratchet mechanism of FIG. 38.

FIG. 39 is a front perspective view of the ratchet mechanism 560 of FIG. 38. The upper projection 576 of each upstanding flange 578 is positioned rearwardly of the forward-most tooth 584 of the corresponding gear 582, thereby creating a gap capable of receiving the catch bar 570 (FIG. 36) therebetween. When the foot pedal 598 is in the up position as shown, the outer plates 596 are retained in position by the pawl springs 590 (via the release links 602) to bear against the pins 597. Each release link 602 is secured to the outer plate 596, to the pawl spring 590 and slidably captured in the curved track 592. Again, the pawl springs 590 bias the pawl arms 588 (and therefor the pawls 586 (FIG. 38)) forwardly, i.e. against the gears 582.

Figure 40:
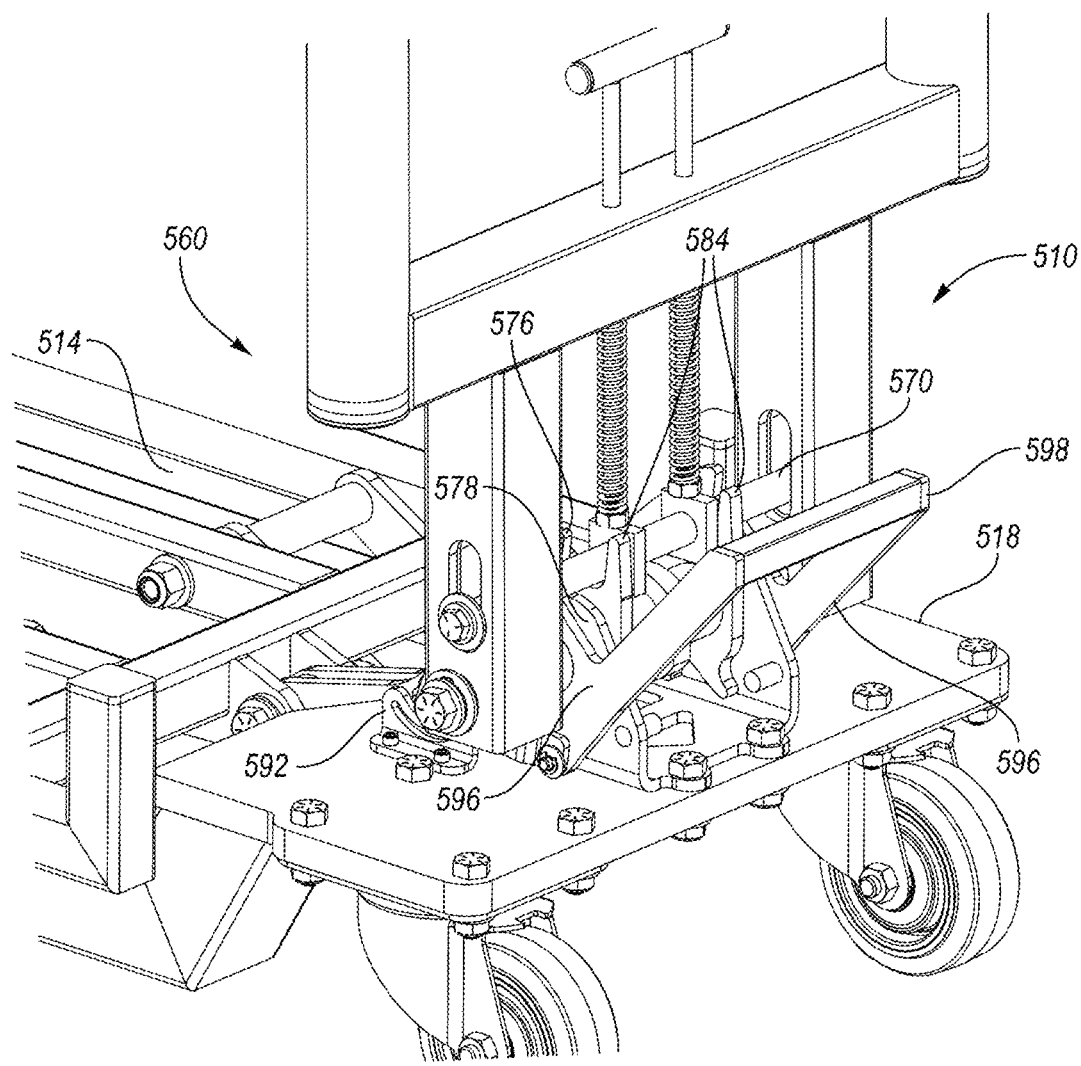
FIG. 40 shows the ratchet mechanism of FIG. 39 with the handlebar installed.

FIG. 40 shows the pallet sled 510 in the same configuration as in FIG. 39, but with the handlebar 526 installed.

Figure 41:
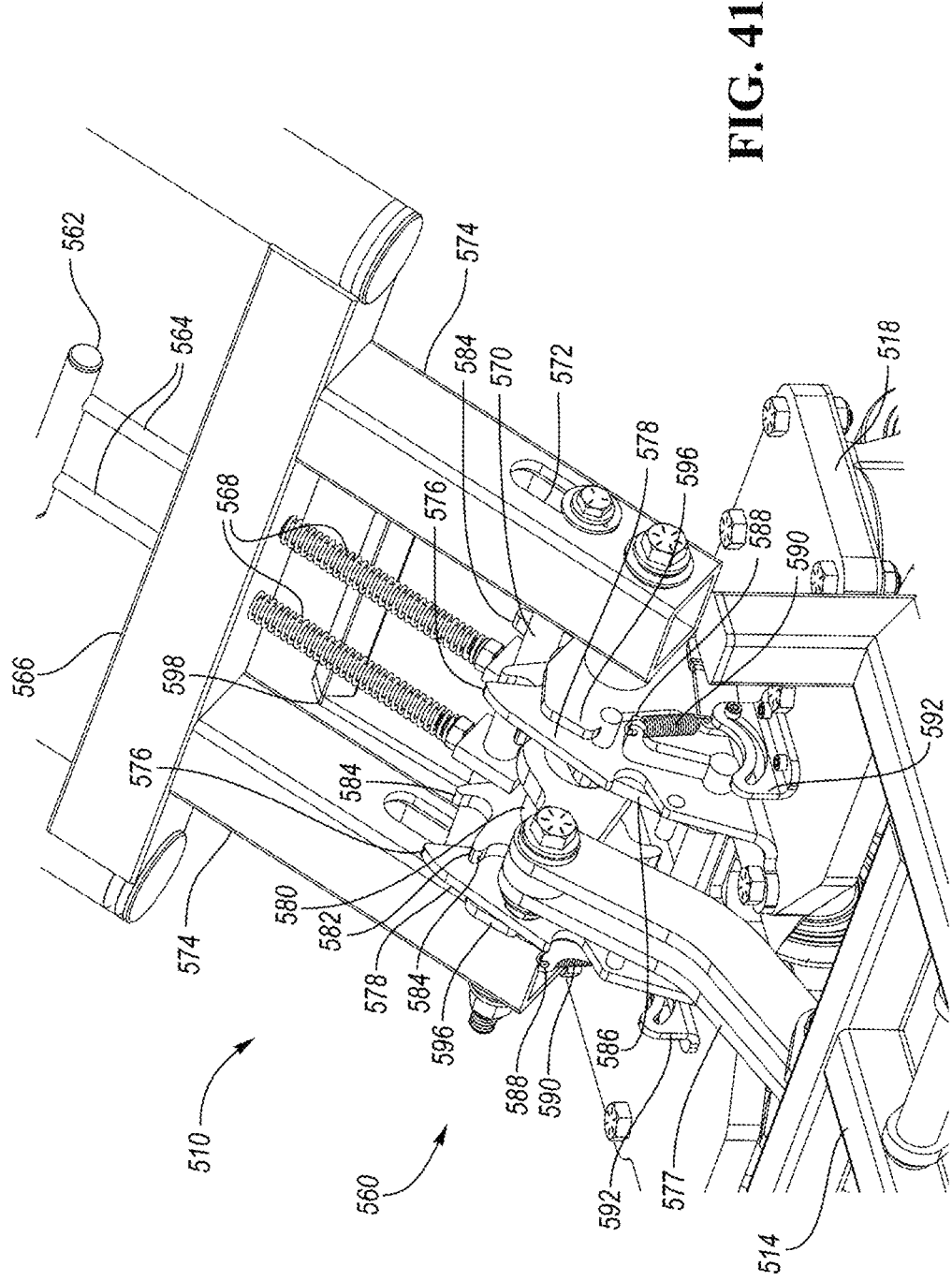
FIG. 41 shows the ratchet mechanism of FIG. 36 with the handlebar pivoted forward to lift the upper frame.

From the position of FIG. 36, in which the catch bar 570 is engaging the gears 582, the user can pull downward and forward on the handlebar 526 as shown in FIG. 41. This rotates the gears 582 and the shaft 580, thereby pulling upward on tension links 577 and raising the upper frame 514. Each pawl 586 is first pivoted rearward away from the respective gear 582 by the next tooth 584. Then, at approximately forty-eight degrees of handlebar 526 rotation (in this example), each pawl 586 snaps under the next ratchet gear tooth 584 because it is biased by the associated pawl spring 590. Then the load can be supported by the locking action of the pawl 586, rather than the user pushing down on the handlebar 526.

The user can then pivot the handlebar 526 upward and rearward again. The catch bar 570 slides over the front of tooth 584, raising the catch bar 570 and compressing the springs 568 against the lower crossbar 566. When the catch bar 570 slides rearward over the tooth 584, the springs 568 drive the catch bar 570 downward into the next notch in the gears 582 adjacent the projections 576 on the upstanding flanges 578.

Figure 42:
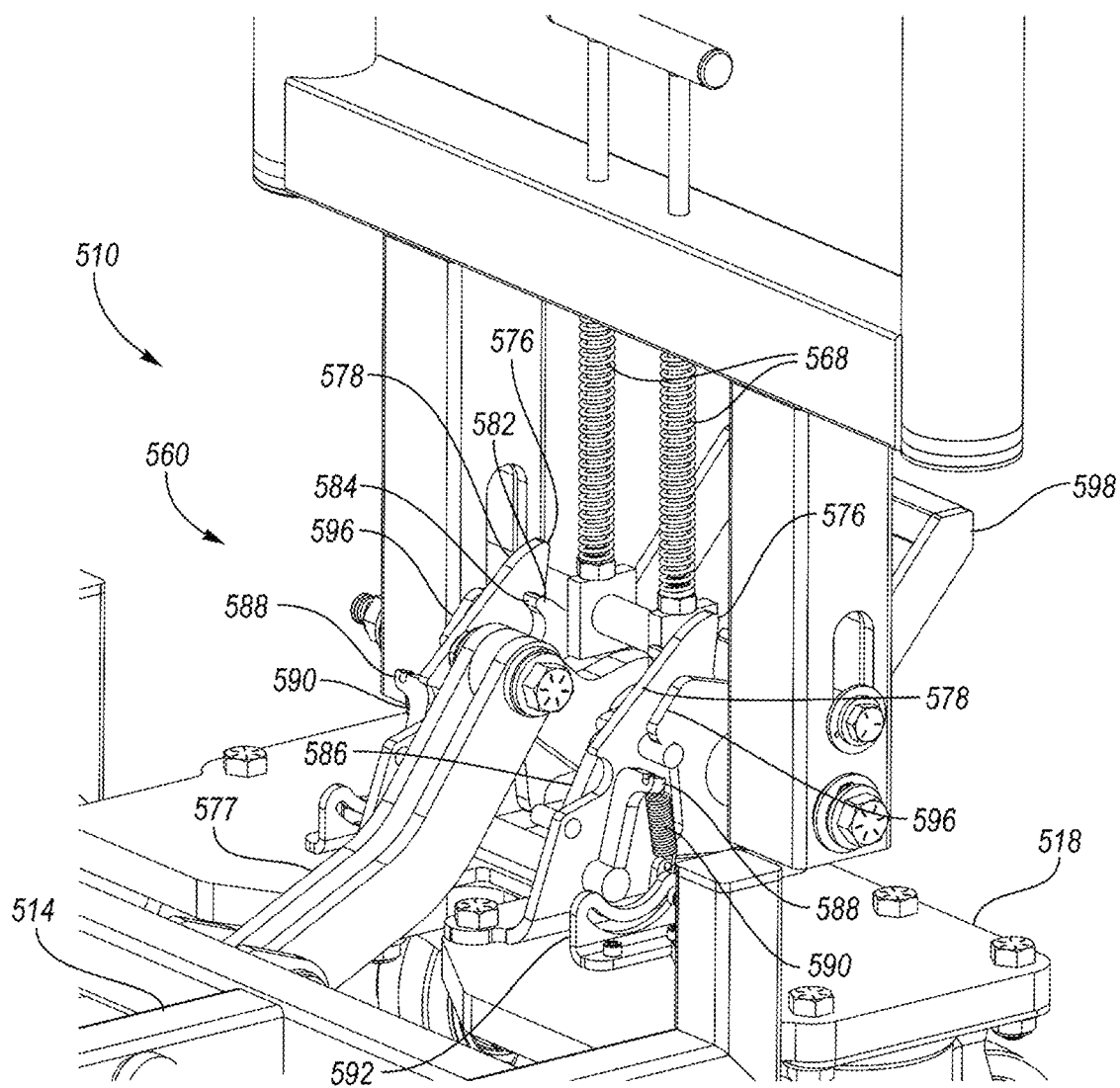
FIG. 42 shows the ratchet mechanism of FIG. 41 with the handlebar raised to engage the next tooth.
Figure 43:
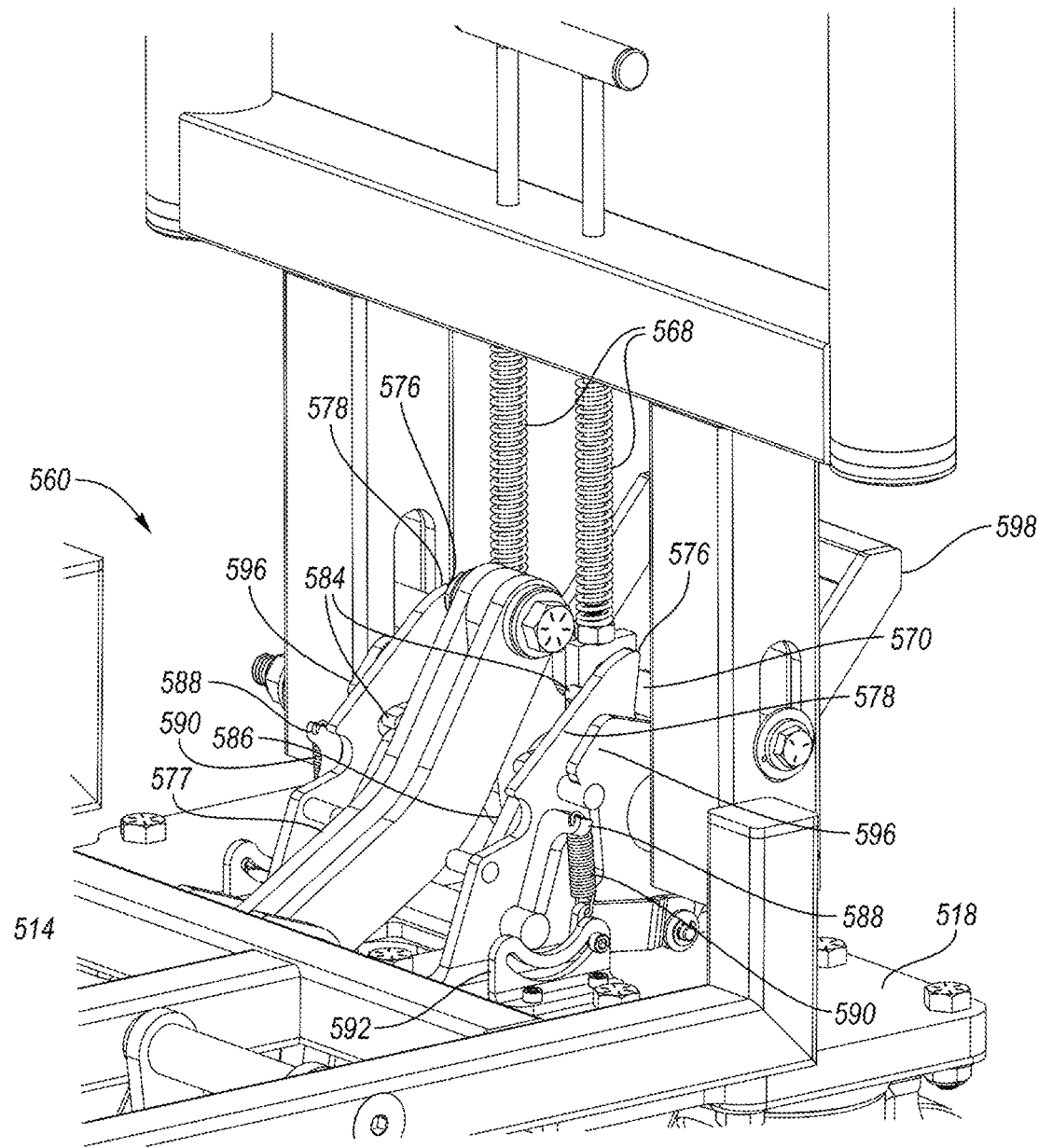
FIG. 43 shows the ratchet mechanism of FIG. 42 with the upper frame raised to the highest position.

If it is desirable to further raise the frame 514, the user pivots the handlebar 526 down again (not shown) to raise the upper frame 514 to the raised position shown in FIG. 42. The ratchet mechanism 560 operates in the same way again, and the gears 582 are again supported by the pawls 586 at the next height. This step can be repeated again to raise the upper frame 514 to the highest position as shown in FIG. 43.

The ratcheting mechanism 560 thus provides incremental lifting of the load and allows a user-selectable lift height. The number of lift height positions would be controlled by the number of teeth 584 on the ratcheting gears 582. User selectable lift heights improves safety because in many scenarios the load may not need to be lifted to max height. Less work is required when lifting only as high as needed. Additionally, the load stability increases and time to lift decreases when the lifted height is reduced.

The variable heights of the upper frame 514 could be used when the pallet is on the floor, at a low raised height (raising the pallet slightly off the floor) or at a high raised height (raising the pallet higher off the floor).

Figure 44:
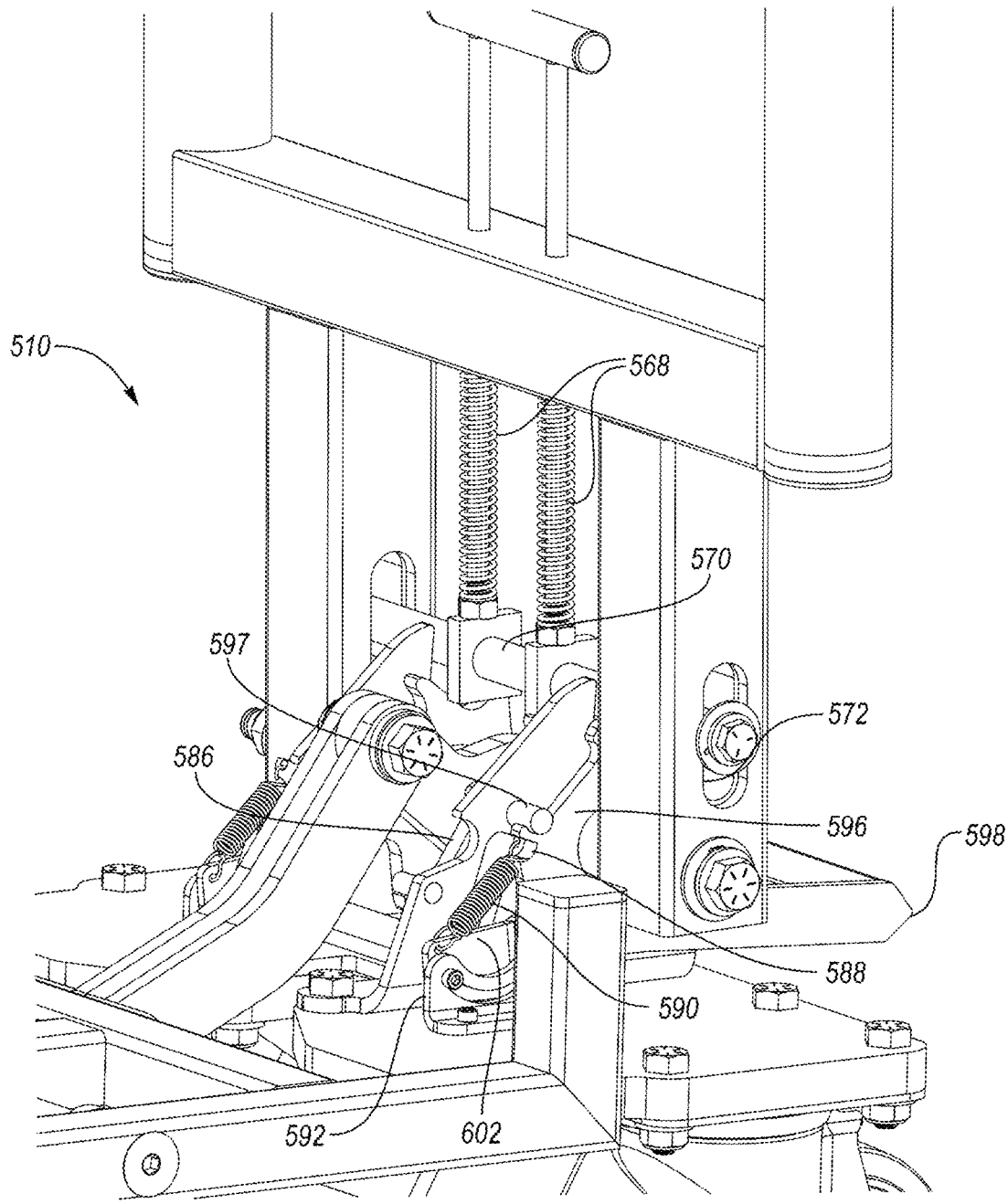
FIG. 44 shows the ratchet mechanism of FIG. 43 in a first step for lowering the upper frame.
Figure 45:
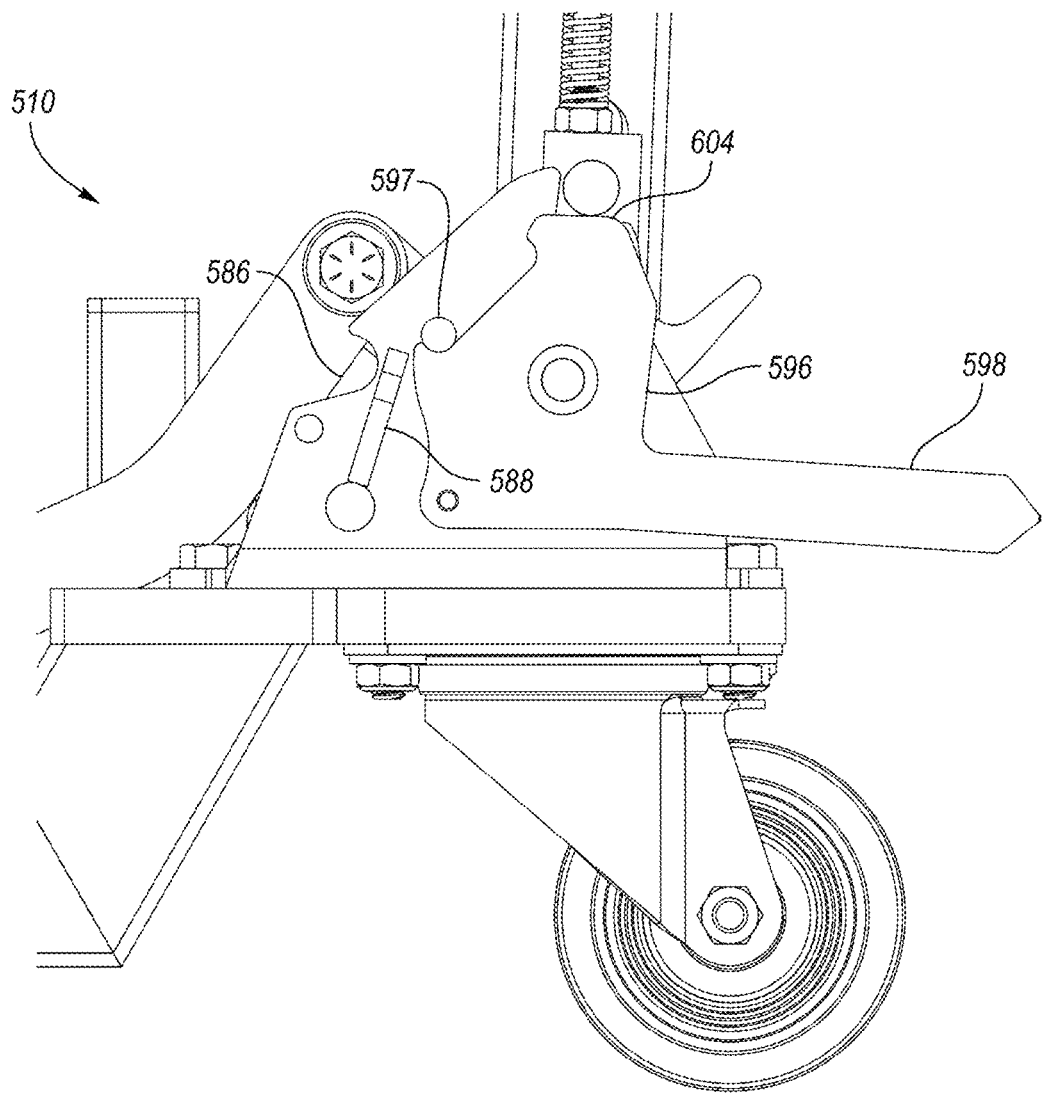
FIG. 45 is a side view of the ratchet mechanism of FIG. 44.
Figure 46:
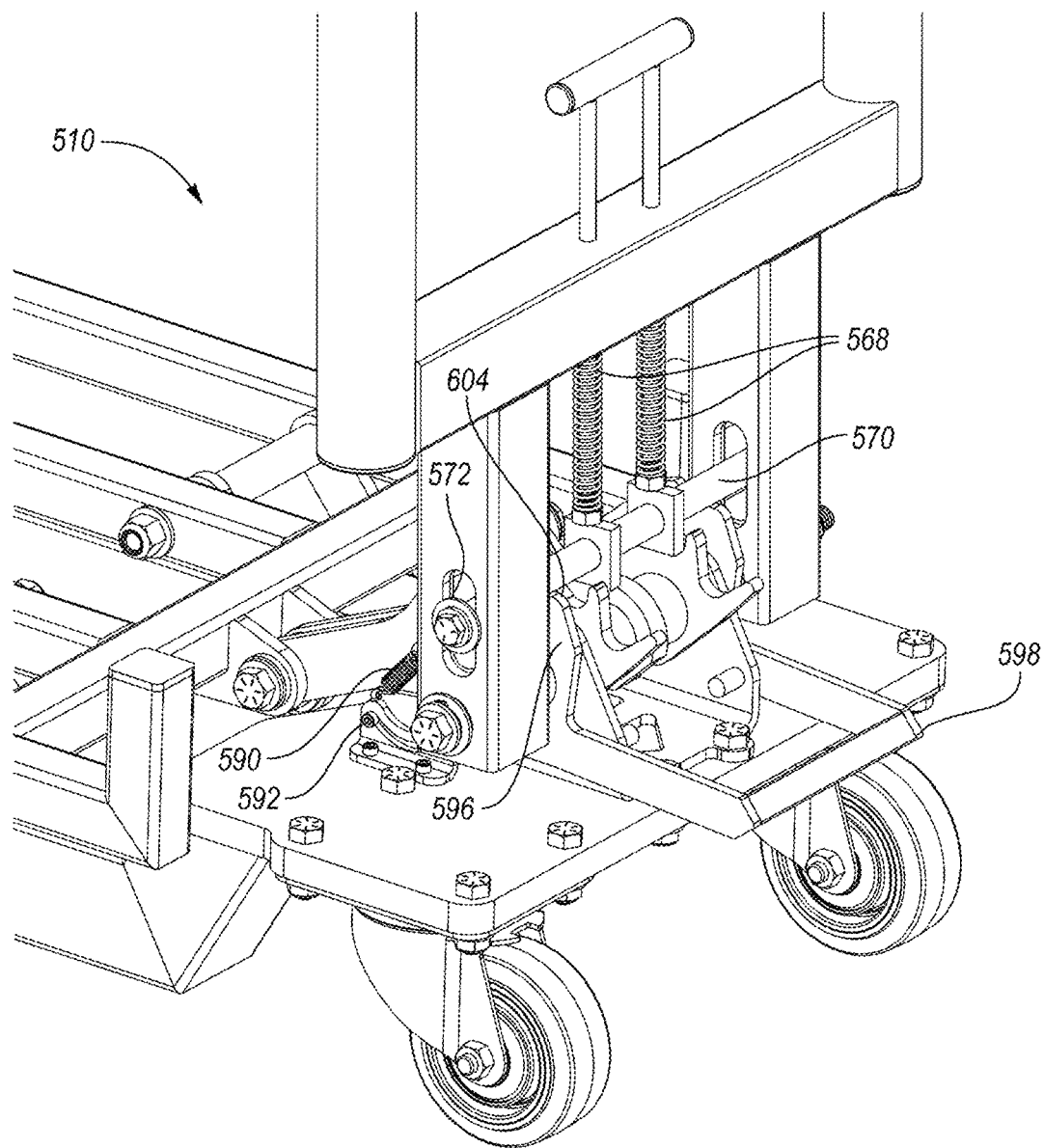
FIG. 46 is a front perspective view of the ratchet mechanism of FIG. 44.

FIGS. 44-46 show the first step for lowering the upper frame 514 with the ratchet mechanism 560. The user presses the pedal 598 down, such as with their foot. This pivots the outer plates 596 and forces the release links 602 rearward, which in turn pulls the lower ends of the pawl springs 590 to the rearward-most end of the curved tracks 592. In this position, the pawl springs 590 bias the pawl arms 588 rearward, but they are held in place by the downward force of the teeth 584 of the gears 582 on the pawls 586.

At the same time, a projecting ramped surface 604 at the top of each outer plate 596 lifts the catch bar 570 as the outer plates 596 rotate. The user can then freely move the handlebar 526 forward and downward.

Figure 47:
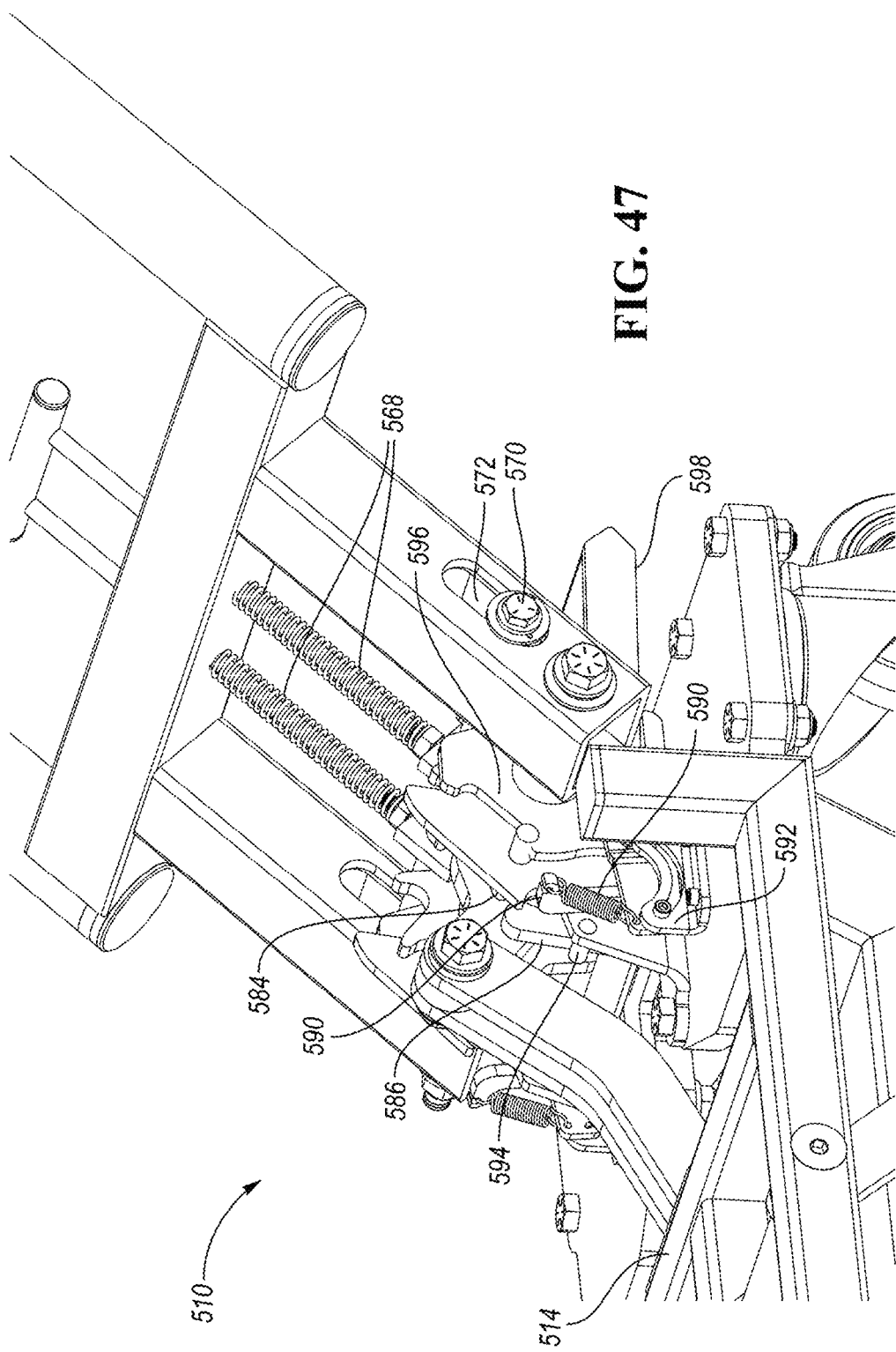
FIG. 47 shows the ratchet mechanism of FIG. 46 in a second step for lowering the upper frame.
Figure 48:
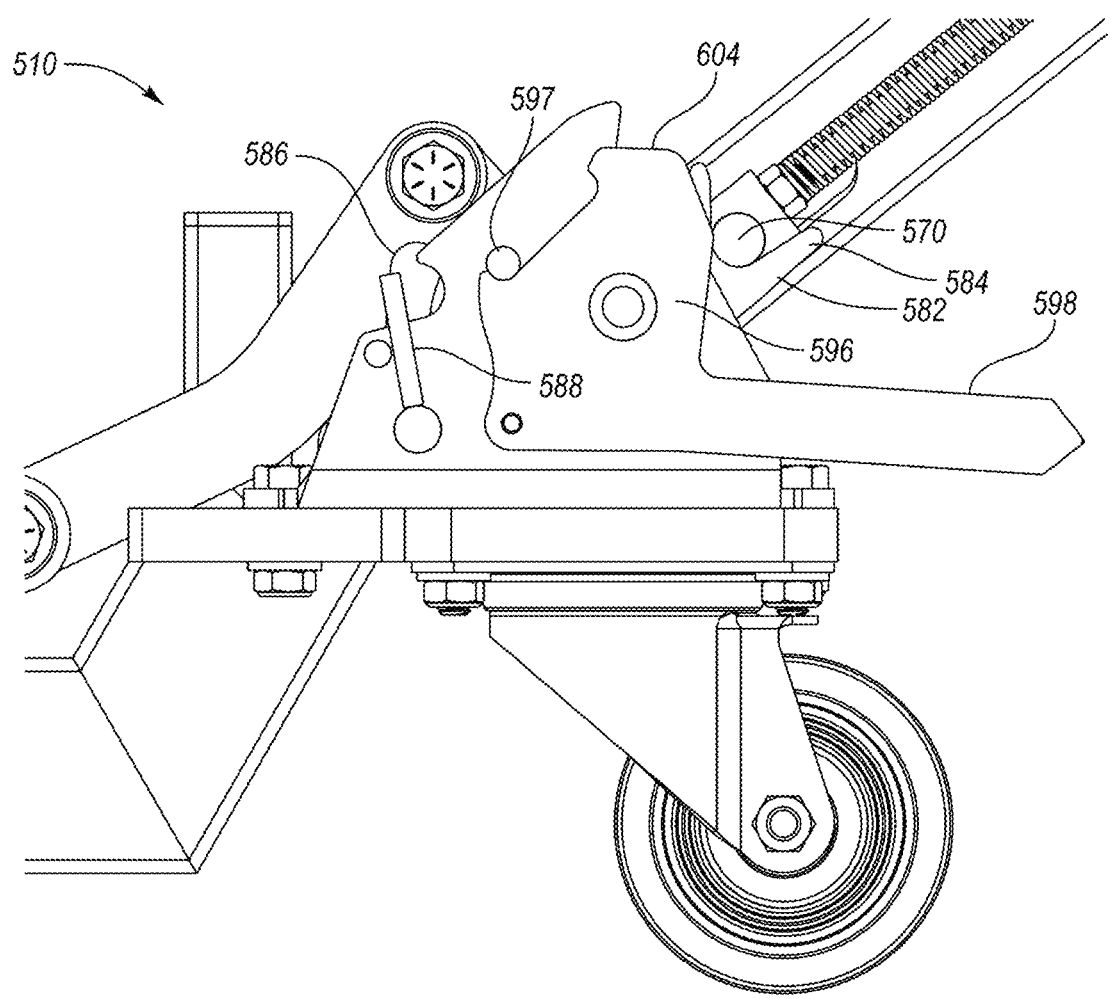
FIG. 48 is a side view of the ratchet mechanism of FIG. 47.

Referring to FIGS. 47-48, as the user moves the handlebar 526 forward, the springs 568 press the catch bar 570 downward in the slot 572 (FIG. 47) and forward of the projecting ramped surface 604 until the catch bar 570 engages the tooth 584 forward of the catch bar 570 (FIG. 48). When the user presses down on the handlebar 526, the catch bar 570 causes the gears 582 to rotate forward enough to take the weight off the pawls 586, such that the pawls 586 are rotated rearward by the pawl springs 590 as shown in FIGS. 47-48. The weight of the upper frame 514 (and any load thereon) is then borne by the handlebar 526. The gears 582 are able to rotate downward under the control of the user holding the handlebar 526, and one gear tooth 584 passes by each pawl 586. The user returns the handlebar 526 to vertical as shown in FIGS. 49 and 50.

Figure 49:
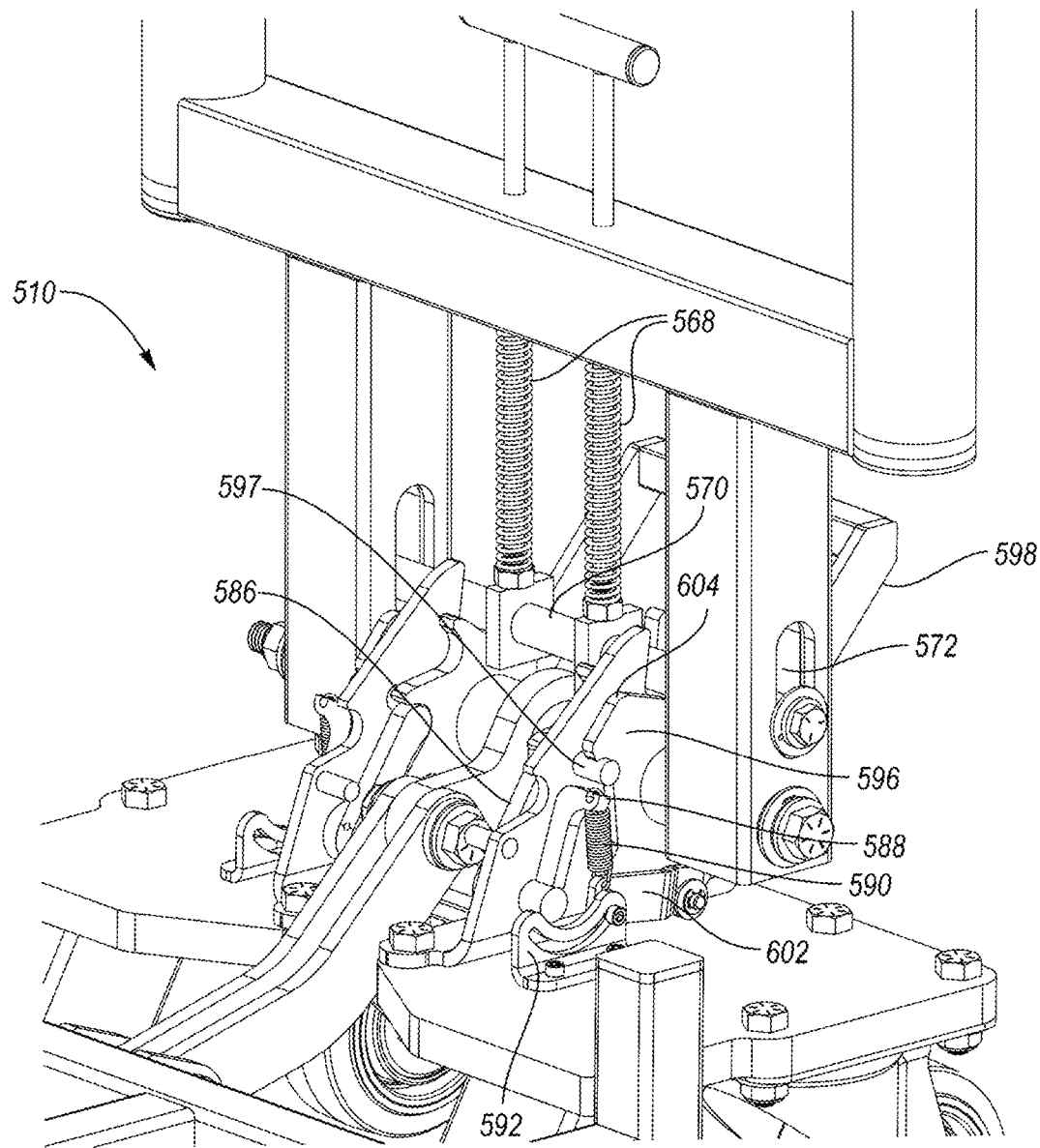
FIG. 49 shows the ratchet mechanism of FIG. 48 in a third step for lowering the upper frame.
Figure 50:
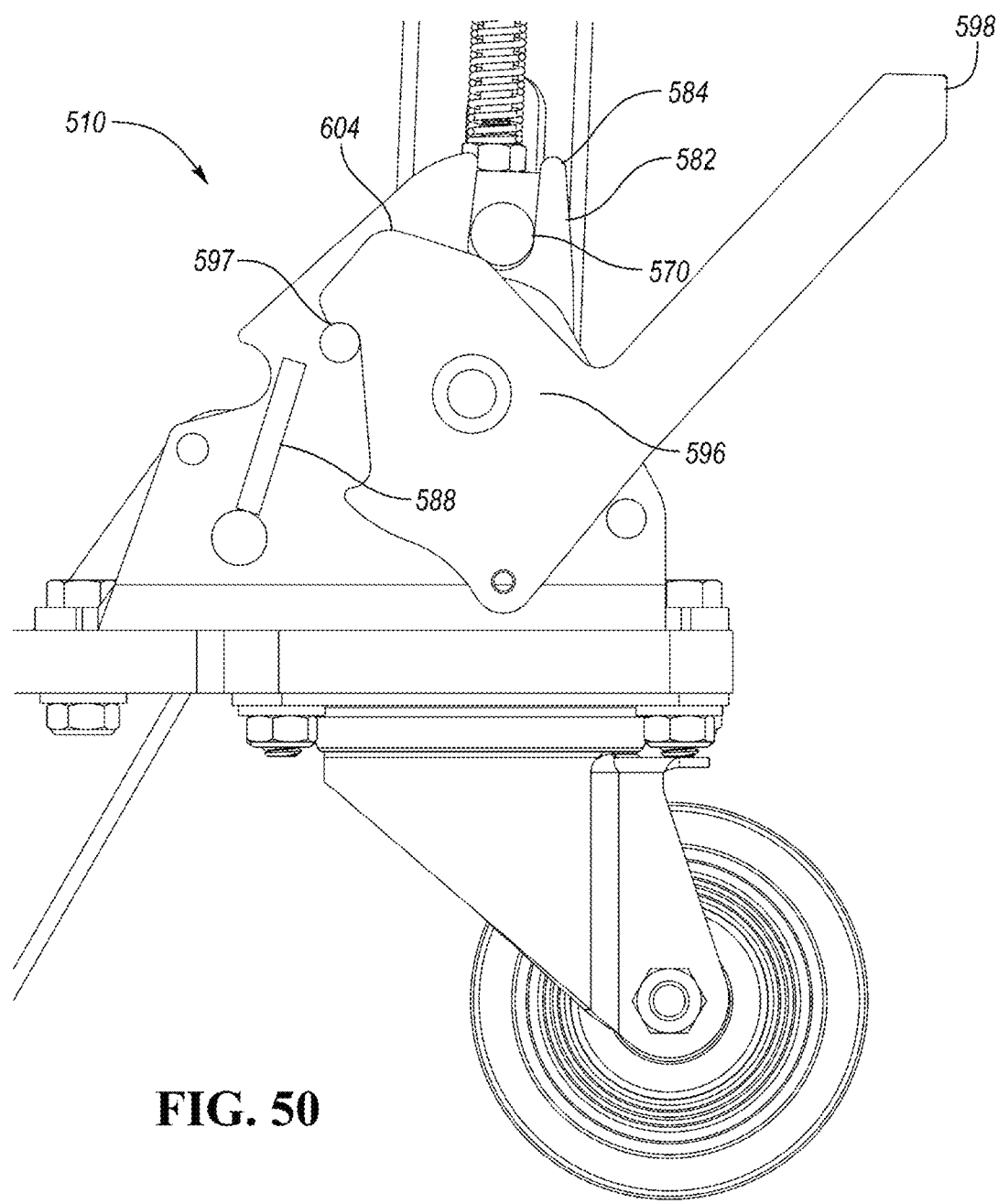
FIG. 50 is a side view of the ratchet mechanism of FIG. 49.

Referring to FIGS. 49 and 50, as the handlebar 526 returns to a vertical position, the catch bar 570 contacts the projecting ramped surface 604 rotating the outer plates 596 rearward and returning the foot pedal 598 to the up position (as shown in FIGS. 49 and 50). The rotation of the outer plates 596 also causes the release links 602 to pull the lower ends of the pawl springs 590 forward to the forward ends of the curved tracks 592. The pawls 586 are then again biased toward the gears 582 and the pawls 586 each catch the next tooth 584. The pawls 586 then bear the weight on the upper frame 514 again.

This process of lowering the upper frame 514 can be repeated, tooth by tooth, controllably lower the upper frame 514 until the pallet on the upper frame 514 contacts the floor (for example).

The ratchet mechanism 560 provides a ratcheting raising and a ratcheting lowering function, permitting the user to easily obtain the desired height while only changing the height by a controllable amount with each pivot of the handlebar 526.

Figure 51:
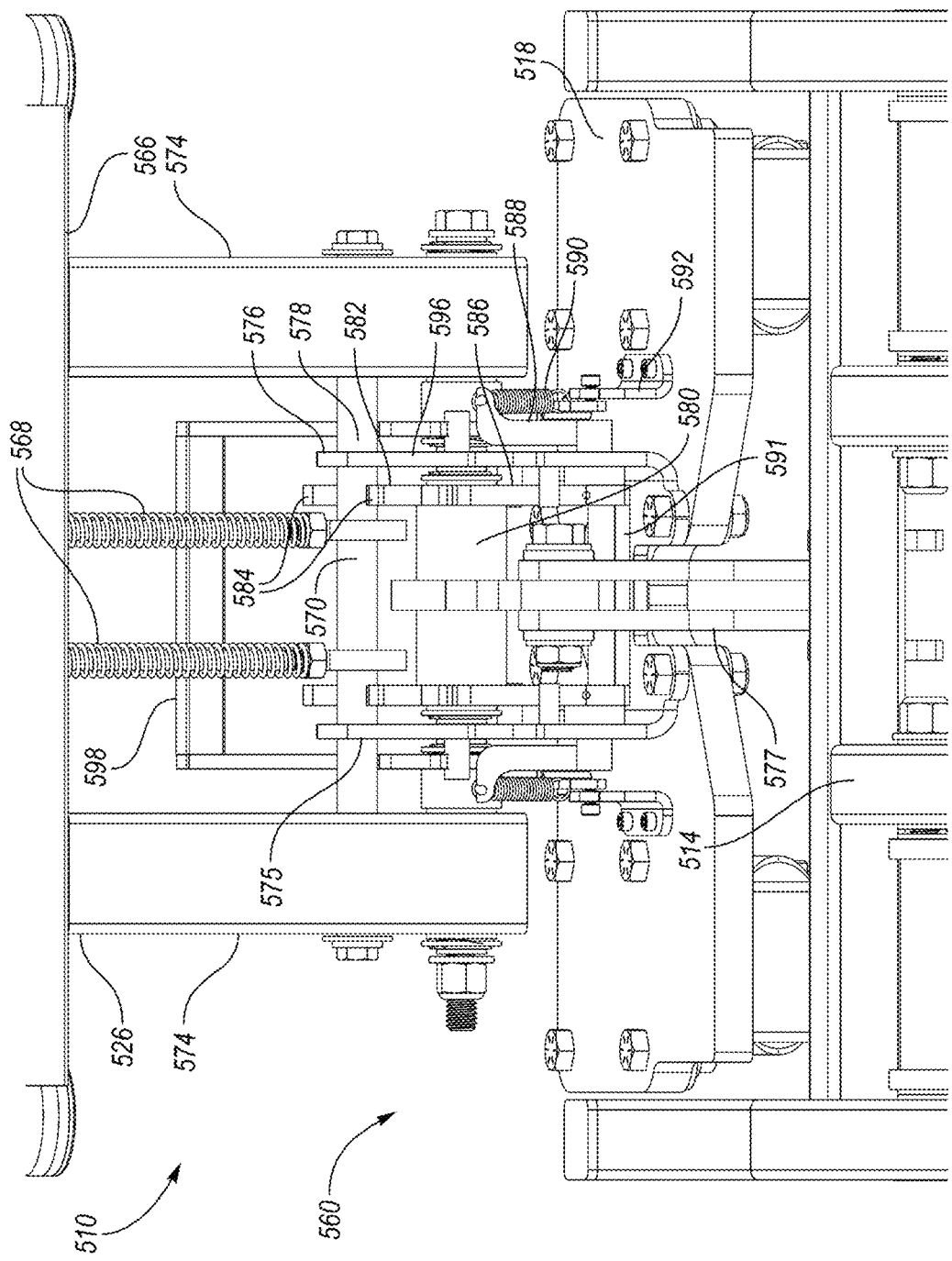
FIG. 51 is a rear view of the ratchet mechanism of FIG. 36.

FIG. 51 is a rear view of the ratchet mechanism 560 area of the pallet sled 510. As shown, there is symmetry between the left side and right side, providing a redundancy of function. Although two of each component are shown in the example, it is possible to implement this ratchet mechanism 560 with just the components on one of the sides (e.g. one gear 582, one pawl 586, etc). Although the pawls 586 are shown connected by the rod 591, such that they pivot together, the pawls 586 could be independent.

Figure 52:
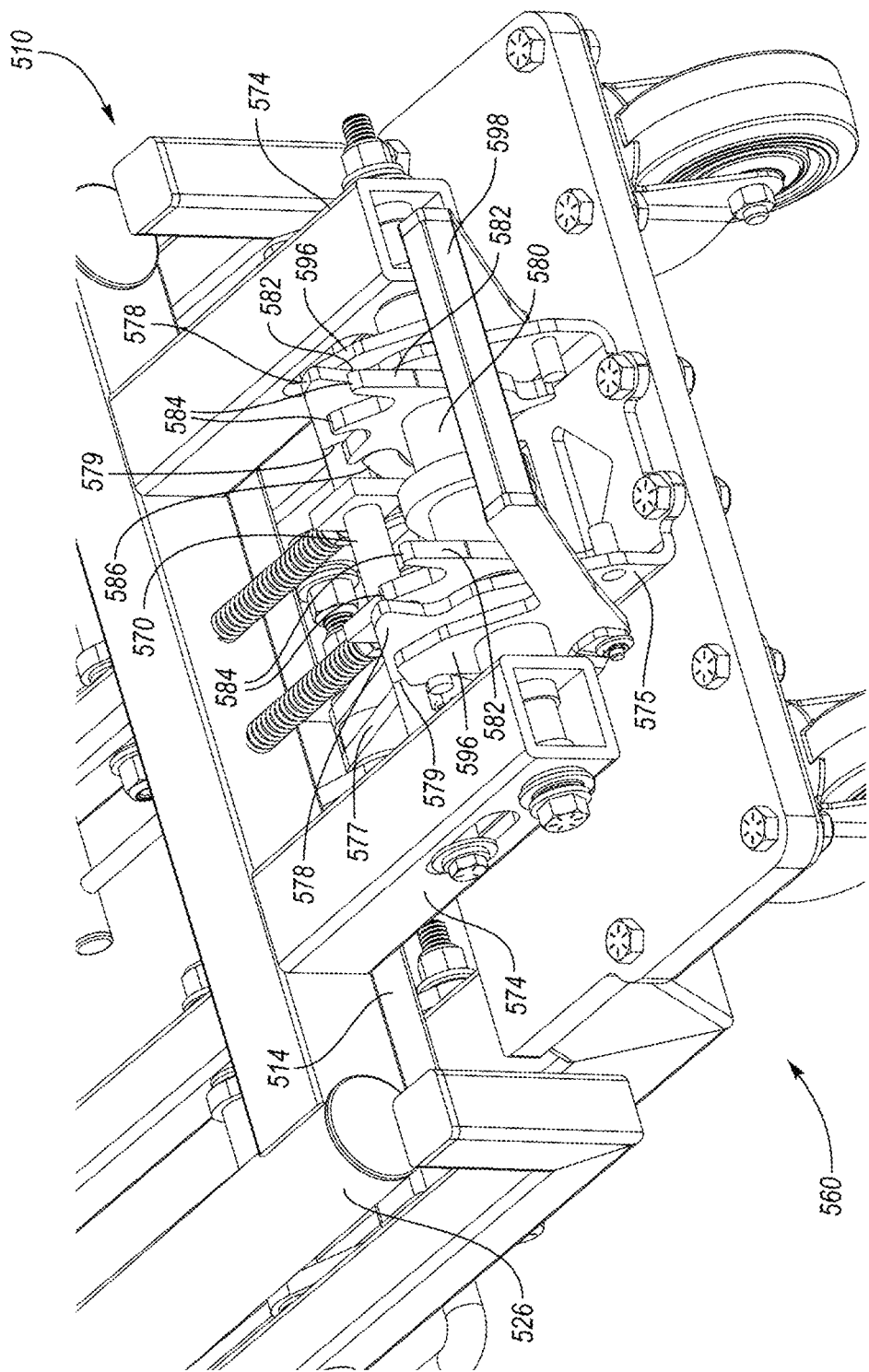
FIG. 52 shows the ratchet mechanism with the handlebar folded down onto the upper frame.

FIG. 52 is an enlarged view of the ratchet mechanism 560 with the handlebar 526 folded down onto the upper frame 514 for storage and transport when not in use. Referring to FIG. 36, the user can lift the catch bar release handle 562 to release the catch bar 570 from the gears 582 and the ratchet cage 575. The handlebar 526 can then be pivoted downward onto the upper frame 514 (not necessarily in contact with the upper frame 514). In the folded position, the handlebar 526 is generally parallel to the upper frame 514. In the folded position, the catch bar 570 is received in the lower notches 579 in the upstanding flanges 578 of the ratchet cage 575, thereby securing the handlebar 526 in the folded position. The handlebar 526 can be released by pulling upward on the catch bar release handle 562.

Figure 53:
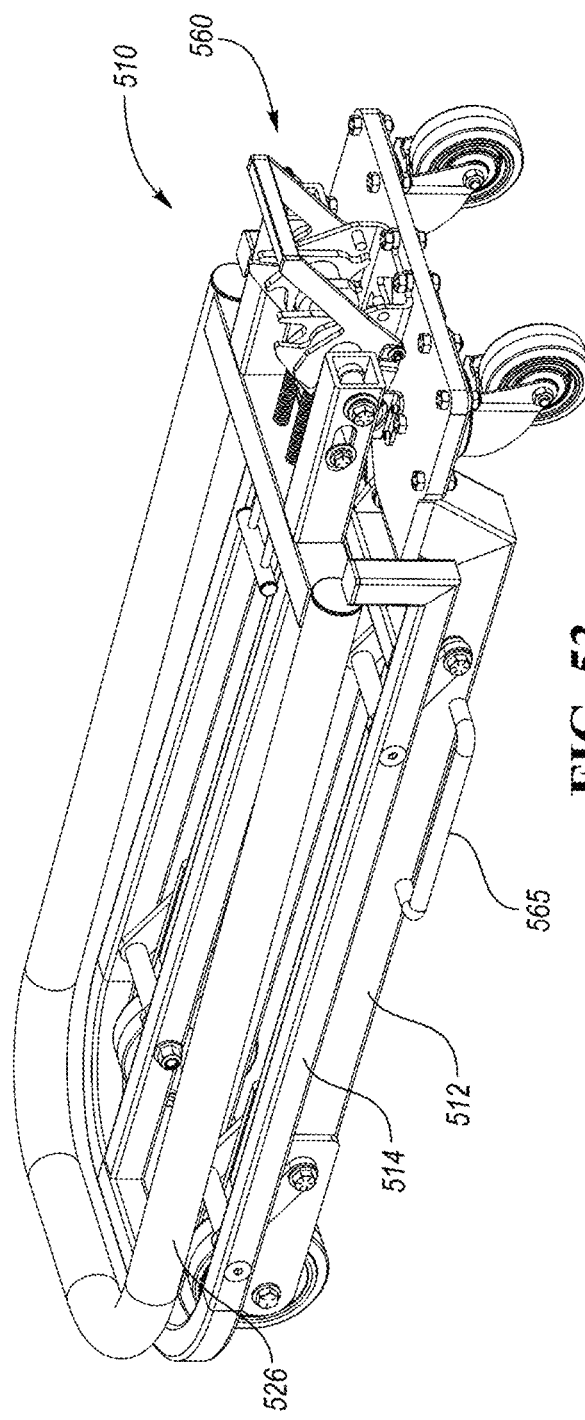
FIG. 53 is a perspective view of the pallet sled of FIG. 36 with the handlebar folded down onto the upper frame.
Figure 54:
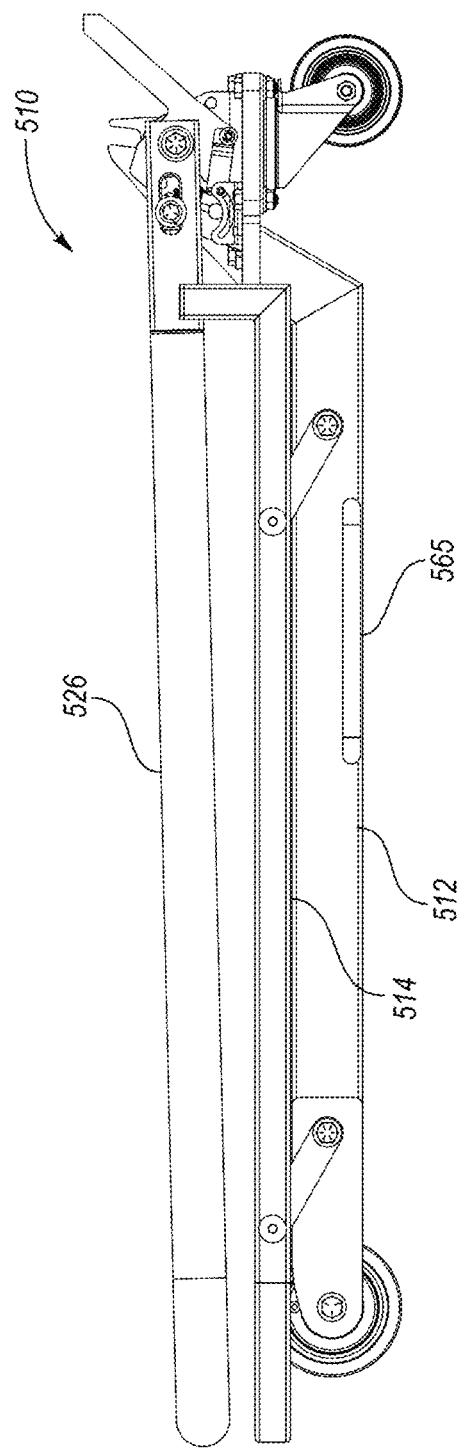
FIG. 54 is a side view of the pallet sled of FIG. 53.

FIG. 53 is a perspective view of the pallet sled 510 with the handlebar 526 folded down onto the upper frame 514. FIG. 54 is a side view of the pallet sled of FIG. 53. The upper frame 514 is shown in the lowered position on the lower frame 512 (with the optional carrying handle 565).

The ratchet mechanism 560 could be used in any of the pallet sleds disclosed herein, with or without any of the handle, frame or wheel extensions.

As an alternative to the specific design shown, the pawl spring 590 orientation could also be controlled by a lever, and/or cable-actuated. The handlebar 526 could also be engaged or disengaged from the ratcheting lift mechanism by way of pin(s), pawl(s), or lever(s).

In another variation, the ratchet mechanism could be comprised of two different ratchet gears that are mechanically attached. The ratchet gear responsible for lifting the load could have teeth spacing every 15 degrees to encourage ergonomic operation of the sled, but the locking ratchet gear, responsible for supporting the load once engaged, could have teeth every 5 degrees which would reduce the distance between teeth and increase lift increments.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet sled comprising:
   a lower frame;
   a plurality of wheels supporting the lower frame;
   an upper frame for supporting a pallet thereon;
   a ratchet configured to lift the upper frame relative to the lower frame, wherein the ratchet includes a gear and a pawl;
   a handle configured to operate the ratchet to lift the upper frame relative to the lower frame;
   a catch bar movably coupled to the handle and selectively engaging the gear; and
   an outer plate pivotably mounted relative to the lower frame and configured to selectively disengage the catch bar from the gear.

2. The pallet sled of claim 1 wherein the ratchet is configured to lower the upper frame.

3. The pallet sled of claim 1 wherein the catch bar is biased toward the gear.

4. The pallet sled of claim 3 wherein the pawl is biased toward the gear when the ratchet is in a lifting mode.

5. The pallet sled of claim 4 wherein the pawl is biased away from the gear when the ratchet is in a lowering mode.

6. The pallet sled of claim 5 wherein the catch bar is configured to engage the outer plate which is configured to switch the pawl from being biased away from the gear to being biased toward the gear.

7. The pallet sled of claim 6 wherein the outer plate is coupled to a spring configured to bias the pawl toward and away from the gear.

8. The pallet sled of claim 7 wherein the outer plate is coupled to a pedal configured to be activated by a foot of a user.

9. The pallet sled of claim 8 wherein the spring has a first end slidably mounted relative to the lower frame and a second end secured to an arm coupled to the pawl.

10. The pallet sled of claim 9 wherein the spring is configured such that it biases the pawl toward the gear when the first end of the spring is in a first position and such that it biases the pawl away from the gear when the first end of the spring is in a second position, spaced away from the first position.

11. The pallet sled of claim 10 wherein the handle is pivotable relative to the lower frame.

12. The pallet sled of claim 1 wherein the catch bar is biased toward the gear.

13. A pallet sled comprising:
   a lower frame;
   a plurality of wheels supporting the lower frame;
   an upper frame for supporting a pallet thereon;
   a ratchet configured to lift the upper frame relative to the lower frame, wherein the ratchet includes a gear and a pawl;
   a handle configured to operate the ratchet to lift the upper frame relative to the lower frame; and
   a catch bar movably coupled to the handle and selectively engaging the gear, wherein the handle is pivotable down into a folded position generally parallel to the upper frame and wherein the catch bar selectively locks the handle in the folded position.

14. A pallet sled comprising:
   a base;
   a lower frame connected to the base;
   a plurality of wheels supporting the lower frame and the base;
   an upper frame pivotably secured to the lower frame, the upper frame configured to support a pallet thereon;
   a gear coupled to the upper frame, such that rotation of the gear in a first direction lifts the upper frame relative to the lower frame;
   a pawl engaging the gear to prevent rotation of the gear in a second direction opposite the first direction;
   a spring biasing the pawl against the gear;
   an outer plate configured to reposition the spring such that the spring would bias the pawl away from the gear; and
   a handle configured to rotate the gear in the first direction.

15. The pallet sled of claim 14 further including a catch bar mounted to the handle and biased toward the gear.

16. The pallet sled of claim 14 wherein a first end of the spring is coupled to the pawl and where in an opposite end of the spring is coupled to the outer plate, such that movement of the outer plate moves the opposite end of the spring so that the spring moves from biasing the pawl against the gear to biasing the pawl away from the gear.

17. The pallet sled of claim 16 further including a catch bar movably mounted to the handle and biased toward the gear, wherein movement of the outer plate disengages the catch bar from the gear.

18. A pallet sled comprising:
a lower frame;
a plurality of wheels supporting the lower frame;
an upper frame configured to support a pallet thereon, the upper frame movable toward and away from the lower frame;
a handle secured at a forward end of the lower frame; and
a wheel extension secured to the lower frame, at least one of the plurality of wheels secured to the wheel extension, wherein the wheel extension is reconfigurable between an extended position forward of the lower frame and a retracted position within an envelope of the lower frame.

19. The pallet sled of claim 18 wherein the upper frame includes a frame extension movable between an extended frame position and a retracted frame position.

20. The pallet sled of claim 18 wherein the wheel extension is pivotable relative to the lower frame between the extended position and the retracted position.

21. A pallet sled comprising:
a lower frame;
a plurality of wheels supporting the lower frame;
an upper frame for supporting a pallet thereon;
a ratchet configured to lift the upper frame relative to the lower frame, wherein the ratchet includes a gear and a pawl;
a handle configured to operate the ratchet to lift the upper frame relative to the lower frame;
a catch bar movably coupled to the handle and selectively engaging the gear; and
a spring biasing the pawl toward the gear when the ratchet is in a lifting mode, the spring biasing the pawl away from the gear when the ratchet is in a lowering mode.

22. The pallet sled of claim 21 further including an outer plate pivotably mounted relative to the lower frame, wherein the outer plate is coupled to the spring.

23. The pallet sled of claim 22 wherein the outer plate is coupled to a pedal configured to be activated by a foot of a user, wherein the outer plate is configured to change the ratchet to the lowering mode.

24. A pallet sled comprising:
a lower frame;
a plurality of wheels supporting the lower frame;
an upper frame for supporting a pallet thereon;
a ratchet configured to lift the upper frame relative to the lower frame, wherein the ratchet includes a gear and a pawl, the gear including a plurality of teeth extending outward from an outer periphery thereof, the pawl configured to engage the plurality of teeth;
a handle configured to engage the plurality of teeth to operate the ratchet to lift the upper frame relative to the lower frame; and
a spring having a first end coupled to the pawl and an opposite end coupled to a slot, such that movement of the opposite end of the spring in the slot changes the spring from biasing the pawl against the gear to biasing the pawl away from the gear.

\* \* \* \* \*